US005794052A

United States Patent [19]
Harding

[11] Patent Number: 5,794,052
[45] Date of Patent: Aug. 11, 1998

[54] METHOD OF SOFTWARE INSTALLATION AND SETUP

[75] Inventor: Henry N. Harding, Foothill Ranch, Calif.

[73] Assignee: Ast Research, Inc., Irvine, Calif.

[21] Appl. No.: 395,569

[22] Filed: Feb. 27, 1995

[51] Int. Cl.$^6$ .................................................. G06F 9/445
[52] U.S. Cl. ............................................ 395/712; 395/651
[58] Field of Search ..................................... 395/650, 600, 395/700, 701, 702, 712, 653, 652, 651

[56] References Cited

U.S. PATENT DOCUMENTS

| 4,590,557 | 5/1986 | Lillie .................................... 364/200 |
| 4,731,735 | 3/1988 | Borgendale et al. ................. 364/200 |
| 5,127,748 | 7/1992 | Okimoto et al. ...................... 400/70 |
| 5,247,683 | 9/1993 | Holmes et al. ....................... 395/700 |

OTHER PUBLICATIONS

"PC Magazine DOS 5 Technique and Utilities", Zitt Davis Press, 1991 by Jeff Prosise. Chapter 5. p. 847.

"Operating Systems" by H. M. Deitel, Addison–Wesley Publishing Company, 1990.

D. R. Carter, Writing Localizable Software for the Macintosh, Addison–Wesley Publishing Company, Inc., pp.3–5, 55–79, 1992.

*Primary Examiner*—Alvin E. Oberley
*Assistant Examiner*—Sue Lao
*Attorney, Agent, or Firm*—Knobbe, Martens, Olson & Bear, LLP

[57] ABSTRACT

A method for reducing the time needed for setting up a computer system in a user selected language version of a disk operating system by pre-installing a plurality of modules for different language versions of disk operating systems. Upon initial power on by an end user, a minimal disk operating system runs a software setup program which installs the end user selected language version of the disk operating system and merges certain factory loaded files into the user selected language operating system. A software installation program is then run which implements the changes necessitated by each of the modules for proper operation thereby resulting in a disk operating system that is properly configured for the operation of the combination of software programs. The computer system is then re-booted to implement the changes to the configuration of the disk operating system.

18 Claims, 3 Drawing Sheets

METHOD OF SOFTWARE INSTALLATION AND SETUP

FIELD OF THE INVENTION

This invention relates to a method of software installation and setup, and more specifically to a method for reducing the time required by a computer manufacturer to install software onto a hard disk drive, and for reducing the time required by an end user to setup a disk operating system and a graphical user interface in a user selected language.

BACKGROUND OF THE INVENTION

Computer Manufacturer Installation

A computer manufacturer typically pre-installs a plurality of software programs onto a hard disk drive of a computer system before the computer system is shipped to a reseller or end user. At a minimum, most computer manufacturers pre-install a disk operating system (DOS) and a graphical user interface (GUI). Currently, a majority of computer manufacturers pre-install Microsoft Corporation's version of a disk operating system called MS-DOS and Microsoft Corporation's version of a graphical user interface called Windows. Furthermore, more and more computer manufacturers are "bundling" a variety of additional software programs onto their computer systems to make them more attractive to the end user.

Although other versions of disk operating systems and graphical user interfaces are available, the terms DOS and Windows are used throughout this disclosure to refer to all types of disk operating systems and graphical user interfaces.

Since a diskette-by-diskette installation of each individual software program onto each hard disk drive of each computer system takes far too much time to complete, computer manufacturers implemented a faster method of installing a plurality of software programs onto the hard disk drive.

Basically, the computer manufacturer takes a particular model of a computer system that is to be shipped with a particular pre-installed bundle of software programs, and manually installs all of these programs diskette-by-diskette onto the hard disk drive, ensuring that all of the configuration files are properly modified.

It is well known in the art that certain software programs need to make certain modifications to what are known as configuration files, such as AUTOEXEC.BAT and CONFIG.SYS files in DOS, and SYSTEM.INI, PROGMAN.INI, and WIN.INI files in Windows, in order for the program to run properly. Other programs need to add certain files to certain directories in order for the program to run properly. Some of these changes are based upon specific hardware components that are present in the particular model of the computer system, such as a specific type of video card, or sound card, etc. Therefore, modifications made to the configuration files for one computer system model may not work if duplicated for use in another computer system model. The term "changes" is used to encompass additions, deletions, and modifications resulting from the installation of a software program.

Once the manual installation process is completed, the computer manufacturer then creates a compressed disk image file using an industry standard compression program called PKZIP, which is produced by PKWARE Inc. The compressed disk image file represents all of the properly installed software programs, properly modified configuration files, and properly added files, on the hard disk drive.

The computer manufacturer then uses this disk image file to rapidly duplicate the installation process on other computer systems by decompressing or "exploding" a copy of the compressed disk image file onto the hard disk drive that is installed in similar computer system models with the same bundle of software programs.

If the compressed disk image file for one computer system model is exploded and downloaded onto the hard disk drive of another computer system model, the configuration files may not be properly modified to work with the different hardware components present in the other model. Therefore, a different disk image file must be created manually for every different hardware and software configuration. This did not pose an immediate problem since many of the computer system models being shipped contained the same set of hardware components and software programs, and thus, the creation of only a few distinct disk image files were required. The use of a disk imaging method, as described above, greatly reduced the amount of time required by computer manufacturers to install predetermined bundles of software programs onto large numbers of similarly configured computer systems.

However, the disk imaging method did not provide enough flexibility, and as a result, created certain disadvantages. Computer manufacturers began shipping a large number of computer systems with different hardware and software configurations, and thus had to create a large number of distinct disk image files, thereby reducing the efficiency of the disk imaging method.

For example, in an effort to meet the needs and desires of each individual customer, computer manufacturers now offer what seems to be an endless combination of various hardware components and various software programs. The more combinations that the computer manufacturer offers, the less number of times that a particular disk image file is used, and the more number of times that a manual diskette-by-diskette installation has to be performed for a new combination.

Therefore, a better solution is required that provides the computer manufacturer with a fast, yet flexible, method of installing software onto the hard disk drive of various computer system models comprising various hardware components and software programs.

End User Setup

Computer manufacturers follow a different procedure when installing software programs onto hard disk drives for computer systems that are being manufactured for shipment to foreign countries. Since DOS and Windows are available in various foreign languages, resellers and end users in France, for example, prefer that a French version of DOS and Windows be pre-installed on the computer system, and resellers and end users in Germany prefer that a German version of DOS and Windows be pre-installed on the computer system, etc.

For computer manufacturers that ship computer systems to many different foreign countries where the end users speak many different languages, it becomes a burdensome task to control inventory such that all computers being shipped to France are pre-installed with the French version of DOS and Windows, and that all computers being shipped to Germany are pre-installed with the German version of DOS and Windows, etc. Therefore, computer manufacturers pre-install every desired foreign language version of DOS and Windows onto every computer system that is being manufactured for shipment to foreign countries. This reduces the amount of time that the computer manufacturers otherwise have to spend keeping track of which computer systems are being shipped to which foreign country. Furthermore, anytime a new foreign country is added to the shipping list, and the language spoken in that country is not available as a choice on the computer system, then the DOS and Windows version of that language are added to all of the computer systems.

However, as a result of this method of loading every desired foreign language version of DOS and Windows onto every computer system destined for a foreign country, the end user at the receiving end suffers some disadvantages associated with such a method. Unlike the computer systems shipped within the U.S. which are typically operational out of the box, these foreign country computer systems must first be set up to work in a user selected language.

Currently, most computer manufacturers pre-install these foreign country computer systems with a fully operational English version of DOS and Windows. When the foreign end user powers up the computer system for the first time, the end user is prompted in various languages to select a desired language for the operating system. Once the user preferred language is selected, a pre-installed setup program begins executing the setup procedure based upon the end user's selection. First, the program deletes all of the files for the non-selected foreign language versions of DOS and Windows. The drawback to deleting all of the non-selected versions first is that if the user immediately realizes that a wrong selection has been made and tries to turn off the computer, the version that the user desired may already have been deleted from the hard disk drive.

After deleting these non-selected versions, the setup program then begins setting up the selected language version of DOS and Windows. Since a fully operational English version is already pre-installed, the setup program uses a patching method which is well known to those of ordinary skill in the art. The patching method begins by swapping certain files in the pre-installed version of DOS and Windows with certain files from the selected language version of DOS and Windows, assuming of course that English is not the selected language. In an effort to minimize the amount of time required for this process, only the files that require changing are changed, and the remaining files are left alone. When the patching method is complete, and all of the necessary files are swapped, the computer system operates in the user selected language.

However, the patching method currently being used by many computer manufacturers requires anywhere from twenty to forty minutes to complete a reconfiguration from the English version of DOS and Windows to the user selected language version, depending on various factors such as the hardware components present in a given computer system.

Once the DOS and Windows programs are fully functional, device drivers and applications are exploded onto the hard disk drive. During this setup process, the computer system typically re-boots multiple times to implement the changes that are being made to the configuration files based upon the hardware component drivers and software programs that are being exploded and installed for that particular model of the computer system. A novice computer user probably does not understand why the computer system is re-booting so often, and may wonder whether the setup program is proceeding properly.

In addition, since all of the non-selected language versions of DOS and Windows are deleted from the computer system's hard disk drive, the hard disk drive is substantially fragmented. A novice computer user does not realize that the fragmented hard disk drive is slowing down the performance of the computer system.

Therefore, a better solution is required that provides the end user with a quicker, less confusing, more convenient, and optimizing method of setting up the software on the hard disk drive of the computer system to operate in a language selected by the end user.

SUMMARY OF THE INVENTION

A method of software installation and setup of the present invention for reducing the time required by a computer manufacturer to install software onto a computer system's hard disk drive, and for reducing the time required by an end user to setup a disk operating system (DOS) and a graphical user interface (GUI) in a user selected language, provides the computer manufacturer with a fast, yet flexible, method of installing software onto the hard disk drive of various computer system models comprising various hardware components and software programs, and also provides the end user with a quicker, less confusing, more convenient, and optimizing method of setting up the software on the hard disk drive of the computer system to operate in a language selected by the end user.

Computer Manufacturer Installation

The method of software installation of the present invention utilizes a modular approach. Rather than creating a disk image of an entire hard disk drive comprising a plurality of pre-installed software programs, the modular approach implements individual modules for each and every software program that is available to the computer manufacturer for downloading onto the hard disk drive of the computer system.

When installing various software programs onto a computer system containing various hardware components, the computer manufacturer is basically concerned with the following things: (1) proper configuration of the operating system and graphical user interface such as DOS and Windows, (2) proper configuration of device drivers such as mouse drivers and video card drivers, (3) proper configuration of application programs such as word processors and spreadsheets, and (4) proper configuration of utility programs such as hard disk drive backup programs.

Typically, the operating system and graphical user interface are installed onto the hard disk drive first, and then the device drivers, followed by the applications and utilities. The installation of the device drivers, applications, and utilities typically require that certain changes be made to the configuration files or Windows directory. Again, it is noted that the term "changes" encompasses additions, deletions, and modifications. Therefore, to implement the modular method, the computer manufacturer loads each individual device driver, application, and utility separately. Each individual driver, application, or utility, is referred to as a single module.

Each device driver and application, or module, that is available for downloading is installed onto a computer system one by one. After each and every separate installation of one of these software programs or modules, all of the files on the hard disk drive are thoroughly checked to determine whether any changes have been made to certain files or directories, such as the configuration files, as a result of the installation of that single particular module. Any changes that are made to any of the files or directories resulting from the installing of that single particular module are recorded into a separate file associated with that module called a "script" file. Each module has an associated script file which specifies every change made to every file.

In this way, an endless number of various combinations of hardware components and software programs can be installed efficiently. For example, assume that an order has come in for a computer system equipped with a version A mouse, a version B video card, a version C word processor, and a version D spreadsheet. With the prior art disk imaging method, if this combination of hardware and software were new, a new disk image would have to be created, and therefore, no time is saved. However, with the modular method, the computer manufacturer simply installs the following modules onto the hard disk drive: the disk operating module, graphical user interface module, version A mouse device driver module, version B video card device driver module, version C word processor module, and version D spreadsheet module.

Since each module, with all of its necessary files and its associated script file, is compressed using an industry standard compression program called PKZIP, and then stored on a hard disk drive, CD-ROM, or other mass data storage device, downloading a new combination of various modules onto the hard disk drive for a new computer system is much quicker than the diskette-by-diskette method of software installation. Furthermore, since the script files for each module automatically implements all changes necessary for that module when the script file is executed, as further described below, the computer manufacturer does not have to spend additional time ensuring the proper installation and configuration of each individual module.

The way in which the script files automatically implement changes to the configuration files is as follows. In a preferred embodiment, a software installation program, called a Hard Disk Master (HDM) program, is loaded onto the hard disk drive along with all of the modules necessary to fulfill a specifically requested configuration. The software installation program runs a batch program called FIX$FILE.BAT and an execution program called SCRIPT.EXE. Once all of the module files, including its associated script file, are exploded and downloaded onto the hard disk drive, the FIX$FILE.BAT program runs the batch files associated with each installed module in the order that the modules are downloaded. The module batch files include an instruction to run the SCRIPT.EXE program. The SCRIPT.EXE program executes the script file associated with that module.

The SCRIPT.EXE and associated module script files are programmed such that the execution of each module's script file by the SCRIPT.EXE program implements the changes required by that particular module to the appropriate configuration files and directories, in order to make that module work properly.

For example, if the proper installation of the model A mouse device driver requires that a line such as "LOADHIGH C:\MOUSE\MOUSE" be written into the AUTOEXEC.BAT file, then the script file associated with the mouse driver module contains instructions which, when run by the SCRIPT.EXE program, implements these changes to the AUTOEXEC.BAT file.

Therefore, since all modules are preferably stored on a single mass data storage medium, and since all configurations are implemented automatically by the SCRIPT.EXE and associated module's script files, this modular method of software installation provides benefits not available with the prior art method of disk imaging.

End User Setup

The method of software setup of the present invention for setting up a disk operating system and a graphical user interface in a user selected language implements the benefits provided by the modular method of software installation discussed above. As previously described, the prior art methods for end user setup of the computer system for operation in a user selected language runs anywhere from twenty to forty minutes, and requires multiple re-boots before the computer system is fully operational in the user selected foreign language.

In a preferred method of software setup of the present invention, the computer manufacturer installs a software setup program, called a Universal Language Master (ULM) program, onto the hard disk drive of computer systems being shipped to foreign countries, which enables the software setup to run automatically with minimal end user input when the computer system is first powered up.

Prior to shipping, the computer manufacturer installs modules of DOS and Windows for every available language desired as an option. These modules are in a compressed format, since multiple copies of uncompressed DOS and Windows in various languages requires a large amount of hard disk space, and since software program modules are typically stored in a compressed format on the mass data storage device.

Various device driver modules corresponding to the installed hardware components in the computer system model being shipped are exploded and downloaded onto the computer system's hard disk drive. However, the associated module's script files and batch files for all of the downloaded modules are not executed by a FIX$FILE.BAT and SCRIPT.EXE program at this time.

A subset of the English version of DOS, in addition to certain files added to the Windows directory by the explosion of certain modules are also installed onto the hard disk drive. This subset version of DOS is the operating system that enables the computer system to boot up when the computer system is first powered up. After boot up, the software setup program runs a program called ULM.EXE. The ULM program prompts the end user with a choice of operating languages and corresponding language keyboard configurations in various languages on the screen. Upon user selection of a language, the software setup program begins converting the operating language of the computer system to the user selected language by running the appropriate batch file for the selected language, which explodes the user selected language versions of the DOS and Windows modules. The language specific batch file acts as a "hook" which connects the software setup process of providing the end user a selection of languages to the software installation process which installs the software using the modular method described previously. Thus, once the software setup program runs the language specific batch program, the software setup program performs a series of steps similar to those performed by the software installation program.

The subset DOS version that is initially loaded at the factory is only a subset because it is eventually replaced by a complete user selected language version of DOS and Windows. Basically, any files that are required by the end user and are independent of the operating language chosen, are exploded and downloaded by the computer manufacturer. Only the files that are specific to the selection of a certain language are downloaded and kept in the compressed module format for later explosion, depending upon the user selection. This cuts down on the setup time of the user selection language modules for DOS and Windows since only the language specific files need to be exploded at that time.

During the setup process, the end user is informed of the percent of setup completed so that the end user is aware that the setup method is proceeding accordingly. Furthermore, the software setup method of the present invention only re-boots once at the end of the process, thereby reducing any concern on the part of a novice computer user as to whether the software setup program is working properly.

Upon selection of a desired operating language and associated keyboard, the software setup program moves all the files in the Root, DOS, and Windows directories of the factory installed files to a temporary directory. The Root, DOS, and Windows directories are sometimes referred to as standard operating directories. The Root directory must be deleted of all files prior to the explosion and installation of the user selected language version of DOS onto the hard disk drive from the compressed module so that the IO.SYS file is the first file loaded into the Root directory when the DOS module is exploded. This process is required for proper boot up of the computer system.

When the computer manufacturer installs a device driver at the factory, certain files relating to the proper operation of the device are stored in the Windows directory. Since the device driver files are independent of the user selected language, they are installed at the factory to minimize later setup time. There are no corresponding files for the device driver files in the user selected language version of DOS and Windows. Updated versions of certain files, such as .DLL (Dynamic Link Library) type files, are loaded at the factory so that older .DLL files which may be a part of the user selected language versions of DOS and Windows can be updated by the setup program to preserve the correct load order.

In other words, certain driver files and .DLL files are installed prior to the installation of the user selected language version of DOS and Windows, and many of these updated .DLL factory installed files have corresponding user selected language version Windows files with the same name. Therefore, the factory installed .DLL files must be moved out of the Windows directory to a temporary directory while the user selected language version of Windows is being install so that the updated .DLL files are not overwritten. By making a copy of these factory installed files to a temporary directory while the user selected language version of DOS and Windows is exploded into the original Root, DOS, and Windows directories, the factory installed files can later be reinserted or rewritten over the older files installed into the original Root and Windows directories during installation of the user selected language versions of DOS and Windows. The end result is as if the driver files and updated .DLL files were installed after installation of the user selected language versions of DOS and Windows, as proper installation order requires.

After the user selected language versions of DOS and Windows are exploded, the software setup program runs a batch file called the FIX$FILE.BAT which executes batch files associated with each of the modules in the order that they are downloaded onto the hard disk drive. Each module's batch file has a line instructing the SCRIPT.EXE program to implement the changes recorded in the module's associated script file, as discussed in greater detail above.

Prior to this point, if the setup was interrupted by a power failure or user intervention, then the end user may be able to restart the software setup program by powering up the computer system, if the subset DOS or user selected language DOS is functional.

After the configuration files are modified according to the script files, all of the extraneous software setup program files no longer necessary at this point and all of the modules of compressed non-selected foreign language versions of DOS and Windows are deleted. By deleting the non-selected foreign language versions last, the end user as a short window of opportunity to change the selection made using the restart process. Since deleting these non-selected files leaves large gaps in the hard disk drive, i.e., the hard disk drive is very fragmented, the software setup program automatically runs a defragmenting program that is available as a standard feature on MS-DOS.

The software setup program then runs a REBOOT.EXE program which removes the last remaining files relating to the software setup program and also deletes itself from the hard disk drive. The REBOOT.EXE program still runs, despite being deleted from the hard disk drive, since the program still resides in temporary RAM memory. The REBOOT.EXE program then warm boots the computer system for the first and only time to implement the user selected operating language. A warm boot is faster and therefore preferable over a cold boot. The computer system setup is now complete and ready to operate in the selected language. The process takes far less time than the prior art method of patching, and only one re-boot is required. Since the advantages of the method of software installation discussed above are used, explosion time, configuration time and the number of re-boots are reduced.

Accordingly, it is an object of the present invention to reduce the time required by an end user to setup a disk operating system and a graphical user interface in a user selected language.

Further objects and advantages of the present invention will become apparent from a consideration of the drawings and ensuing description.

DETAILED DESCRIPTION OF A PREFERRED EMBODIMENT

Figure 1:
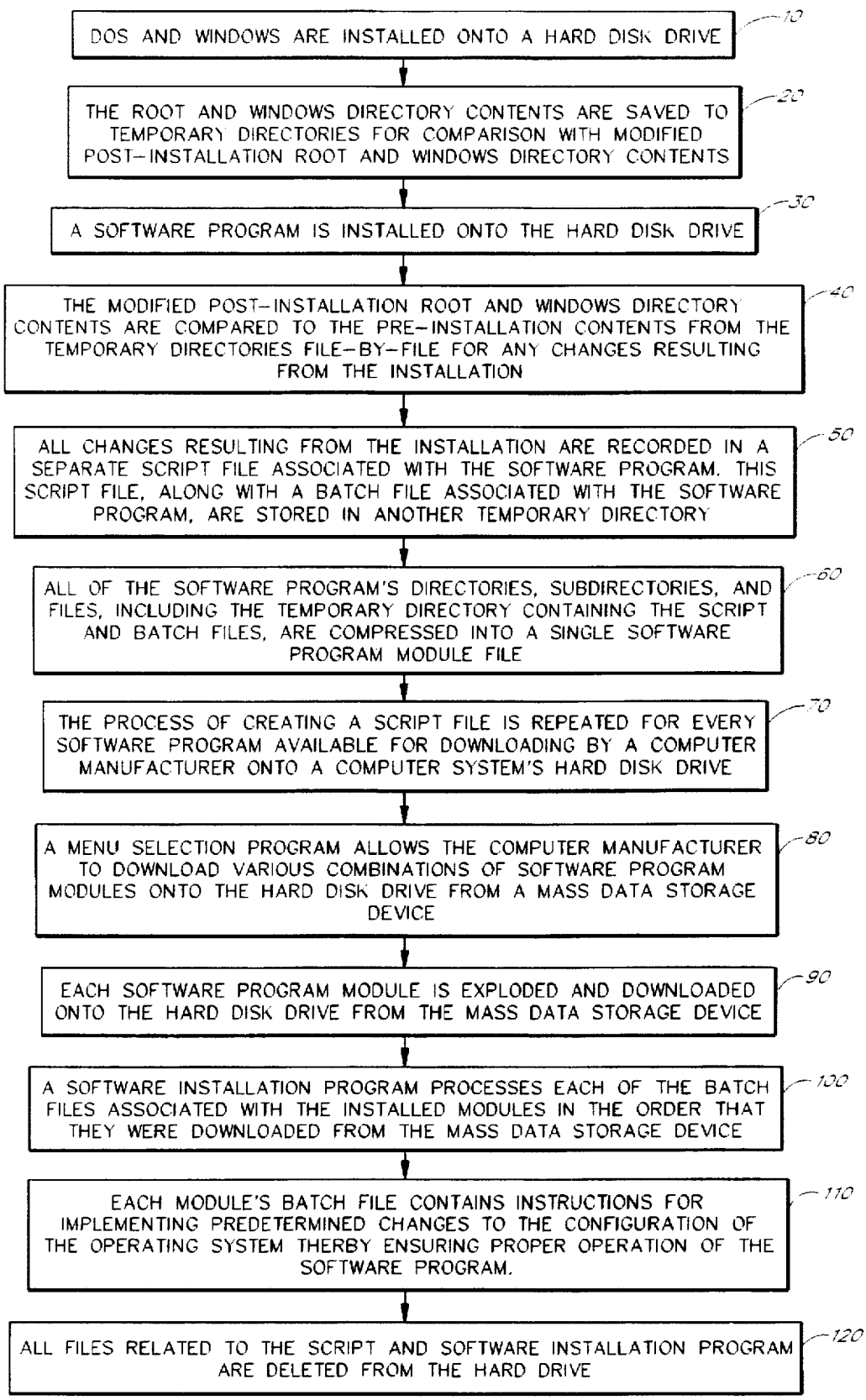
FIG. 1 is a flow chart of a method of software installation.

FIG. 1 is a flow chart of a method of software installation. The steps involved in the method of software installation of the present invention are described in greater detail below, with reference to FIG. 1.

In order to implement the method of software installation of the present invention, one of the first things that a computer manufacturer must do is determine the changes that a driver, application program, or utility program, makes to the Root, DOS, and Windows directories and files during installation of that particular program. Therefore, the computer manufacturer installs DOS and Windows onto a computer system 300, as shown in box 10. The Root, DOS, and Windows directory contents are then saved to a temporary directory, as shown in box 20, so that after the installation of a particular software program, changes in the Root, DOS, and Windows directory contents can be compared to the original contents stored in the temporary directory.

For purposes of terminology, a disk operating program, a graphical user interface program, device drivers, utility programs, and application programs, are referred to herein as software programs, and the use of the term software program is meant to represent these various types of programs. Each of these software programs are installed individually, mutually exclusive of other software program installations, so that the exact changes directly attributable to that particular software program can be determined, as shown in box 30.

One by one, every software program that the computer manufacturer currently makes available in an end product is installed, and the resulting Root, DOS, and Windows directory contents are compared to the original contents, in order to determine the changes made. For example, assume that the particular computer system 300 is to be shipped with a model A mouse. The computer manufacturer therefore needs to create a module for the mouse driver software program. As shown in box 30, the mouse driver software is installed onto the computer system 300. Upon successful installation, the Root, DOS, and Windows directory contents are compared to the original contents, as shown in box 40. Assume, for the purpose of this example, that the only change made is the addition of a single line to the AUTOEXEC.BAT file in the Root directory. The added line reads as follows: "LOADHIGH C:\MOUSE\MOUSE."

Any changes made to any files resulting from the installation of the software program, in this case the addition of a single line to the AUTOEXEC.BAT file, are recorded in a separate "script" file associated with that software program and stored in a temporary directory, as shown in box 50. These script files are basically files containing predetermined changes to the configuration of DOS and Windows. A corresponding batch file is created to run the script file.

Figure 2:
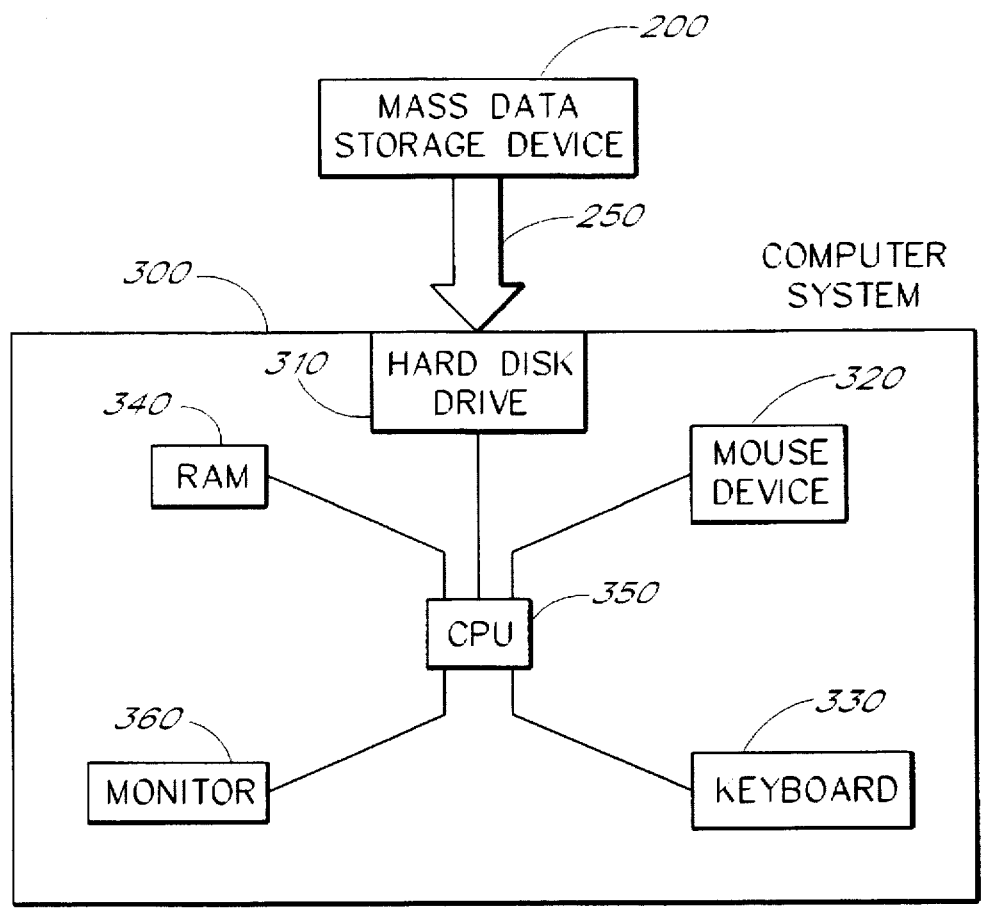
FIG. 2 is a block diagram illustrating a connection of a mass data storage device with a hard disk drive of a computer system to facilitate the downloading of modules from the mass data storage device to the hard disk drive.
Figure 3:
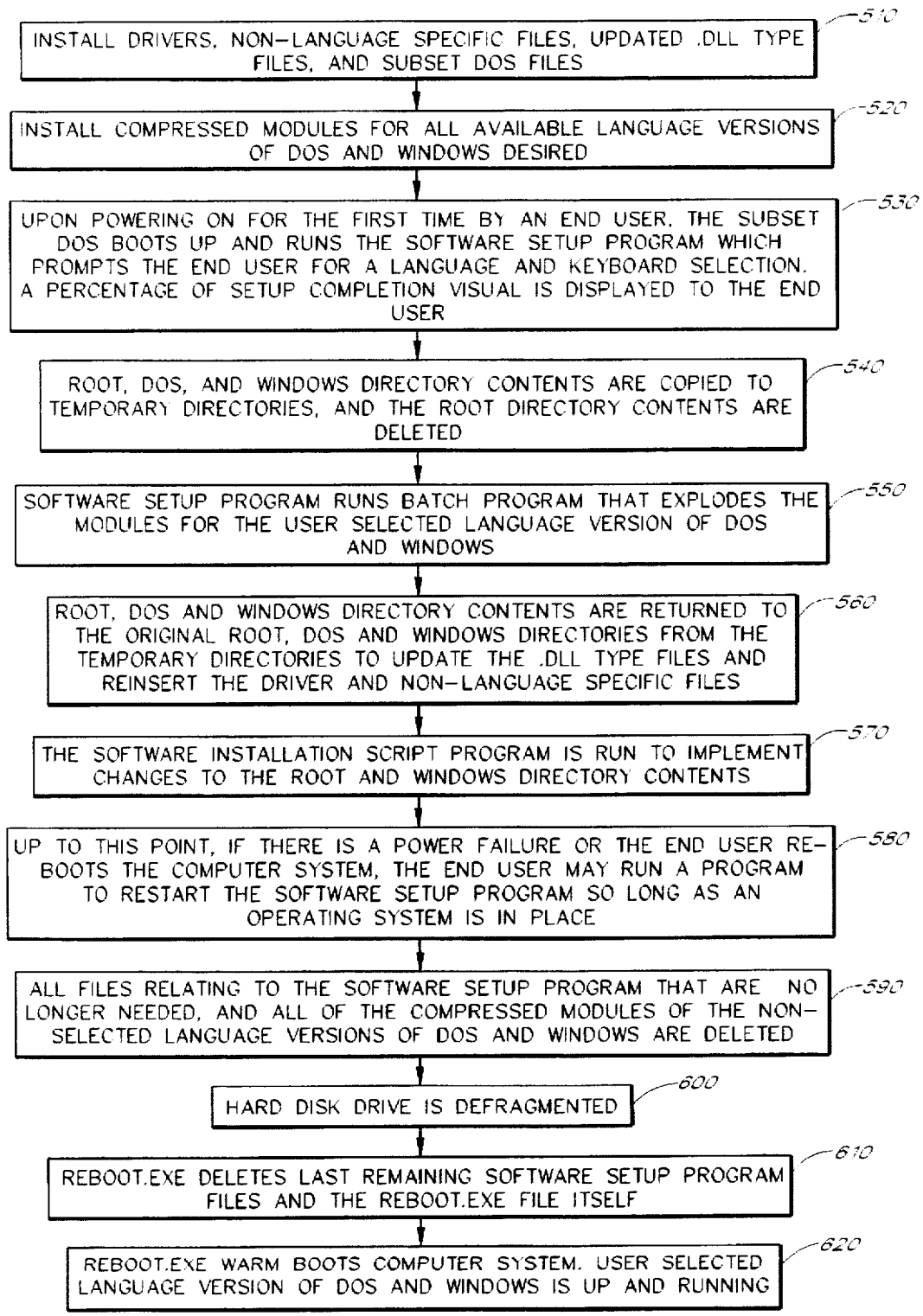
FIG. 3 is a flow chart of a method of software installation and setup.

As shown in box 60, the directories, subdirectories, and files installed by a particular program, plus the temporary directory containing the script file and batch file associated with that software program, are all compressed into a module using an industry standard compression utility program called PKZIP. Then, when the module is later decompressed, all of the software program's directories, subdirectories, and files are exploded onto a hard disk drive 310 (as shown in FIG. 2), along with the temporary directory containing the script and batch files.

For example, assume that after successful installation, a word processor program creates a directory called WP and a subdirectory called TUTOR. Then the module for this software program includes the WP directory, the TUTOR subdirectory, all of the files in the WP directory and TUTOR subdirectory, and the temporary directory containing a script file called WP.SPT and a batch file called WP.BAT. All of this data is compressed into a single file, called the word processor module, by the PKZIP compression program.

In the method of software installation of the present invention, once a module is created for each software program, as shown in box 70, there is no more need for a diskette-by-diskette installation to be performed. This is not true with the disk imaging method, where only a slight change in a hardware or software bundle configuration required the reinstallation of many of the same software programs over and over again using the diskette-by-diskette process.

One of the benefits of the present invention is the simplicity in which various combinations of software programs are downloaded to the hard disk drive 310. For example, assume that the computer system 300 is to be configured with DOS, Windows, a model A mouse driver, a model B video card driver, a model C word processor, and a model D spreadsheet. The computer manufacturer simply loads all of the modules for all of the software programs onto a mass data storage device 200 (as shown in FIG. 2). A menu system is used which assigns a distinct part number to each software program module, or software program bundle. Assume that the part numbers for the six requested modules above are 111, 222, 333, 444, 555, and 666, or that the part number for that particular software bundle is 99999. Then the computer manufacturer simply inputs the appropriate numbers to the menu system to request this combination of software. No diskette-by-diskette installation is required even if such a combination of software has never been prepared before.

Note that the DOS and Windows modules do not have a temporary directory or an associated script file. The DOS and Windows modules only contain the directories, subdirectories and files associated with the DOS and Windows software program respectively, since changes to the DOS and Windows programs are typically made by the installation of other software programs.

As shown in FIG. 2, the hard disk drive 310 of the computer system 300 is connected to the mass data storage device 200 to facilitate the downloading of various modules onto the hard disk drive 310. The hard disk drive 310 is placed in the computer system 300 that it is to be shipped with, and this computer system 300 is connected to the mass data storage device 200 such that the selected modules for that particular computer system 300 are downloaded to that computer system's 300 hard disk drive 310.

However, the particular hard disk drive 310 can also be installed into another computer system (not shown) after this downloading process. The hard disk drive 310 does not necessarily have to be in the computer system 300 that it will eventually be shipped in, so long as the modules being downloaded onto the hard disk drive 310 correspond to the computer system (not shown) in which the hard disk drive 310 will eventually be shipped.

Typically, software program modules are downloaded from the mass data storage device 200 to the hard disk drive 310 via a parallel port connection, or a network connection between the mass data storage device 200 and the computer system 300. Various implementations for downloading data from the mass data storage device 200 to the hard disk drive 310 are known in the industry, and is not new. It is to be understood that the specific implementation used to implement the method of the present invention is not important. Many various implementations are known and can be adapted to the present method.

Therefore, by simply entering the number or numbers associated with the desired software programs into the menu system, as shown in box 80, the mass data storage device 200 retrieves the selected software program modules, downloads and explodes the directories, subdirectories, and files associated with the selected software programs, including the temporary directory containing the script and batch file, to the hard disk drive 310, as shown in box 90.

After the computer manufacturer finishes exploding all of the selected modules onto the hard disk drive 310, a temporary directory, called TEMP for illustrative purposes, now contains the script and batch files for the mouse module, the video card module, the word processor module, and the spreadsheet module. The computer manufacturer also downloads a software installation program onto the hard disk drive 310. The software installation program comprises a program called FIX$FILE.BAT and a program called SCRIPT.EXE. The purpose of the FIX$FILE.BAT program is to execute all batch files associated with each module in the order that they are downloaded from the mass data storage device 200, as shown in box 100.

FIX$FILE.BAT executes each module's batch program which runs each modules's script file located in the TEMP directory in the order that the modules are downloaded onto the hard disk drive 310. There are certain situations in which the operation of a certain software program depends upon whether that program is downloaded before or after certain other programs. Therefore, the computer manufacturer structures the menu selection system such that the download order of the selected modules will not create operational problems based upon load order.

In the present example, the batch files in load order are, for illustrative purposes, called the MOUSE.BAT, VIDEO.BAT, WRDPRCSR.BAT, and SPRDSHT.BAT files. As shown in box 110, the MOUSE.BAT file, for example, contains an instruction line that reads "SCRIPT.EXE MOUSE.SPT." This instruction runs the SCRIPT.EXE program which implements the changes recorded in the MOUSE.SPT file. The MOUSE.SPT is the script file for the mouse module, and contains all changes made to the Root, DOS, and Windows directories as a result of the installation of the mouse software program. The MOUSE.SPT file contains lines that read "%C:\AUTOEXEC.BAT" and "PATH=˜LOADHIGH C:\MOUSE\MOUSE." Based upon predetermined instruction codes defined by the computer manufacturer, these two lines instruct the computer system 300 to place the line "LOADHIGH C:\MOUSE\MOUSE" directly above the "PATH" line in the AUTOEXEC.BAT file of the Root directory.

The FIX$FILE.BAT then runs the VIDEO.BAT, WRDPRCSR.BAT and SPRDSHT.BAT files which in turn runs the SCRIPT.EXE files which implement the changes that are recorded in a VIDEO.SPT, WRDPRCSR.SPT and SPRDSHT.SPT script files, as shown in box 110.

In this way, each module is responsible for updating the Root, DOS, and Windows directories so that that particular module operates properly. Since each module carries its own instructions for implementing its necessary changes, various different combinations of modules do not increase the amount of work required, as would be required by the prior art disk imaging method.

Once all of the module batch files are run, all of the script and FIX$FILE associated files are deleted from the hard disk drive 310, as shown in box 120, and the installed software is now properly configured for all of the installed software program modules. This process significantly reduces the time necessary for the computer manufacturer to create various new combinations of software bundles.

FIG. 2 shows the hardware elements associated with the method of software installation of the present invention. The mass data storage device 200 is in communication with the computer system 300 via a data bus 250. The mass data storage device 200 can be a stand-alone computer system (not shown) or part of a computer network (not shown). Typically, the mass data storage device 200 is a very large hard disk drive (not shown) although it could also be a plurality of CD-ROMS or other data storage devices (not shown).

The computer system 300 comprises the hard disk drive 310. The method of software installation of the present invention works whether the hard disk drive 310 is to be shipped with the computer system 300, or whether the hard disk drive 310 is to be shipped with another computer system (not shown) so long as the modules being exploded and downloaded onto the hard disk drive 310 correspond to the computer system, 300 or otherwise, that the hard disk drive 310 will eventually be shipped in.

The typical computer system 300 further comprises a mouse 320, a keyboard 330, internal random access memory 340, and a central processing unit 350. All of these components are interconnected through, or in communication with, the central processing unit 350. Most computer systems 300 are not sold with a monitor 360. Monitors 360 are usually sold separately.

FIG. 4 is a flow chart of a method of software installation and setup. The steps involved in the method of software installation and setup of the present invention are described in greater detail below, with reference to FIG. 4.

When the computer manufacturer installs software on computer systems being shipped to a foreign country, a different method of software installation is followed. Rather than shipping a computer system that has all of the bundled software completely pre-installed and ready to run for the end user, foreign country computer systems have the software completely pre-installed but not completely ready to run. Therefore, these computer systems require a method of software setup in addition to the method of software installation described above.

It is to be understood that various methods of downloading data from one data storage device to another are known in the industry, and that the following steps are supported by the previous discussion relating to the hardware elements shown in FIG. 2, as well as information generally known in the art.

The foreign language versions of DOS and Windows have many of their files in the corresponding foreign language. However, there are certain files that are only in English, regardless of which foreign language version DOS or Windows is being used. One such example is a wallpaper file that is used as a background pattern in a graphical user interface. Therefore, to minimize the setup time for the end user, the computer manufacturer downloads and explodes every file that is not specific to a selectable language. In other words, every file that is needed, but not specific to a particular foreign language, is pre-installed in an uncompressed format at the factory, as shown in box 510.

This includes certain .DLL type files which get updated periodically. Since it is desirable to have the most recent .DLL files in place when the complete setup process is completed, these updated .DLL files are also installed onto the hard disk drive at the factory. Since many device drivers are independent of the user selected language version of DOS and Windows, they are also installed onto the hard disk drive at this time. However, the script and batch files associated with these driver modules are not executed at this time.

In addition, a software setup program is installed onto the hard disk drive along with a minimal number of the English version DOS files to serve as an operating system when the computer system is first powered up by the end user. This minimal version is called a subset version. The subset version is used since it is not known which language version of DOS and Windows will eventually be installed by the end user.

As shown in box 520, modules for every available language version of DOS and Windows that is desired are pre-installed in their compressed modular format onto the hard disk drive of the computer system. As discussed previously, the benefit of this is that the computer system is no longer specifically configured for one particular foreign country. The computer system is shipped to any country that speaks one of the languages that have been installed.

The software setup program is designed to perform the following steps once the computer system is received by the end user in a foreign country. As shown in box 530, when the end user first assembles and powers on the computer system, the computer system boots up using the subset version of DOS that is installed at the factory. This subset version runs the software setup program. The software setup program prompts the end user, in various foreign languages including English, to select the desired language of the operating system and graphical user interface. The software setup program also prompts the end user to select a language keyboard configuration. It is understood in the art that various configurations for keyboards exist to accommodate various languages. Therefore, an option is provided which correlates the chosen operating system language with the corresponding language keyboard. These are the only two inputs the end user must provide before the software setup program takes over. Once the software setup program takes over, a bar indicating a percentage of the setup process completed is displayed to the end user to assure the novice computer user that the setup process is proceeding accordingly.

Once the end user selects a preferred operating language, the software setup program, called the Universal Language Master program in a preferred embodiment, copies all of the Root, DOS, and Windows directory contents to temporary directories. The contents of the Root directory are then deleted so that the selected language version of DOS can be properly installed into the Root directory, as shown in box 540.

At this point, the software setup program simulates the method of software installation used by the computer manufacturer when preparing computer systems for the U.S. The software setup program begins exploding the user selected compressed modules that are on the hard disk drive, similar to the way that the menu system downloads and explodes selected modules from the mass data storage device. In this case, the user selected language versions of DOS and Windows are exploded onto the hard disk drive, as shown in box 550. Applications, if included, may be exploded at this point as well.

Certain drivers, English only files, and updated .DLL type files are loaded at the factory prior to the selection and installation of the user selected language version of DOS and Windows. These additional files are not a part of the newly installed user selected language versions of DOS and Windows. Since the factory installed .DLL files are the most recent ones available, there is a good probability that older versions of .DLL type files are installed as part of the selected language version of DOS and Windows. Therefore, the Root, DOS, and Windows directory contents that are moved to a temporary directory prior to the explosion and installation of the user selected language versions of DOS and Windows are now copied back into the original Root, DOS, and Windows directories, or standard operating directories, thereby replacing older .DLL type files of the same name with the updated .DLL files that were loaded at the factory. Also, the English only files and driver files are written back into the original Windows directory as well, as shown in box 560.

Once that step is completed, the hard disk drive contains a complete version of the user selected language DOS and Windows, and a temporary directory containing script and batch files for various drivers loaded at the factory, such as MOUSE.SPT, MOUSE.BAT, VIDEO.SPT and VIDEO.BAT. Similar to the portion of the software installation method discussed previously, the FIX$FILE.BAT program runs the batch files associated with each module in the proper load order, and the batch files run the SCRIPT.EXE program, thereby implementing the changes required by each specific module. For example, as discussed previously, the mouse module requires that a line be added to the AUTOEXEC.BAT file. In this example, execution of the MOUSE.BAT files runs the SCRIPT.EXE file which implements the MOUSE.SPT file by placing the necessary line into the AUTOEXEC.BAT file recently installed by the user selected language DOS module, as shown in box 570.

Unlike the prior art, which deletes the non-selected foreign language modules first, the present method does not make these deletions until the end of the process. That means that so long as an operating system is in place, i.e., the factory installed subset version of DOS or the complete DOS version of the user selected language, then the computer system can be restarted, and in most situations, the end user can select another language. This is especially beneficial in the situation where the end user makes an incorrect selection. By retaining the non-selected language modules until the end, an incorrect selection can be reversed so long as the decision to restart is made while the computer system has an operational operating system in place, as shown in box 580. Otherwise, the computer system may not reboot, although using a boot disk may solve this problem. By re-booting from a disk, the end user may be able to execute a program called RESTART.EXE which runs the software installation program from the beginning.

Once the scripting program is executed, and all of the necessary changes are made to the configuration files, all files related to the software installation and setup method that are no longer needed are deleted, along with all of the non-selected compressed language modules, as shown in box 590.

Since there are many non-selected language modules, they take up a lot of space on the hard disk drive. The deletion of these modules leaves large gaps in the hard disk drive. This results in a condition known as a fragmented disk. This affects the performance of the computer system. Therefore, as shown in box 600, the hard disk drive is defragmented using the defragmenting utility that is standard on the MS-DOS version of DOS, which is used in a preferred embodiment.

Upon completion of the defragmenting program, or upon interruption of the defragmenting program by the end user, a REBOOT.EXE program is run, as shown in box 610. This program deletes the last remaining files relating to the software setup method, including the REBOOT.EXE file itself. The REBOOT.EXE program still runs since the program is stored in RAM memory. The REBOOT.EXE program then causes the computer system to warm boot so that all of the changes to the configuration files are implemented, as shown in box 620. The warm boot is preferred to a cold boot since it is quicker, and saves time. The computer system is now fully operational in the end user selected language, and with all of the configuration files and directories changed to ensure proper operation of the factory installed drivers, and if applicable, all factory installed applications.

While the above description contains many specificities, these should not be construed as limitations on the scope of the invention, but rather as an exemplification of preferred embodiments thereof. Many other variations are possible. For example, while MS-DOS and Windows are used in a preferred embodiment, many other disk operating systems and graphical user interfaces are available which can be adapted to the above disclosed methods of software installation and setup. The term "operating system" shall be given its broadest meaning throughout the specification and claims, and is meant to encompass disk operating systems, as well as graphical user interface operating environments.

Furthermore, Microsoft Corporation's Windows graphical user interface in its current version is more of an operating environment than an operating system. However, it is well known in the industry that Microsoft Corporation is developing a new generation of operating software presently called Windows 95. Windows 95 is a graphical user interface that is also a disk operating system, and not just a disk operating environment. It is to be understood that the method of software installation and setup described above can be implemented by a person of ordinary skill in the art to any disk operating system, regardless of whether a graphical user interface is integrated into the operating system or not.

Moreover, it is to be understood that the mass data storage device encompasses a CD-ROM, and an end user may use a CD-ROM player to download data from the CD-ROM to the hard disk drive according to the methods claimed herein.

Appendix A comprises printouts of software programs relevant to the software installation program discussed above.

Appendix B comprises printouts of software programs relevant to the software setup program discussed above.

APPENDIX A

```
@echo off
rem Module:
rem 05/04/94.
rem 1)   New method.  Uses DOS' load order of .bat - no more inc_apps.bat!
rem 2)   Add DOS boot sector fixups code here so that our DOS DISKH's can
rem      remain generic for std builds as well as custom modular builds.
rem 3)   Add Notebook fixups:
rem      a)  move \tmp1 to \temp for Mfg to run worldkid.bat
rem      b)  check if \tmp2 dir is present - if so, then we know it's a
rem          notebook, so tweak Windows to reflect MS-DOS system with APM.
rem      c)  CHAMELEON ONLY - if ASC900xx.CDU exists, then make sure we
rem          put the ZDISK110.CDU/.AST files into \ASTDU.  Also put a
rem          copy of ZDISK.EXE on the hard drive.
rem 4)   7/14/94, HNH, Added support for Fuji 2: If ASTWORKS,
rem      put focus on main, arrange group icons, new main and acc groups.
rem 5)   7/20/94, RJC, Add logic to check if APM already installed by the
rem      Power Management Enable DISKHM 911439-931.  If true, don't process
rem      notebook.exe (see comment 3b above).
rem 6)   7/25/94, HNH, Add script (SDRB4MSC.SPT) to arrange the MSCDEX line
rem      before the smartdrv line.  (Ft. Worth says it causes problems in
rem      AST Works).
rem 7)   08/04/94, HNH, Remove Windows swap file win386.swp and spart.par.
rem      Mod for AST Works because they don't want to do master a swap file.
rem 8)   08/05/94, RJC, Remove the Chameleon-specific fixup to add the
rem      ZDISK program and DU image - it is now being added via its own
rem      DISKHM module 911586-931 ASTDU P/ZDISK v1.30 R1.00
rem 9)   08/25/94, GJS,HNH -- added ability to merge windows *.reg files
rem 10)  09/22/94, HNH   Do not remove VBRUN300.DLL.  Use AST_FA instead
rem      of DOS' ATTRIB.
rem 11)  1139940a, 10/14/94, HNH 1)  Rename WINDOWS\WINSTART.BAT to .TAB before
rem      running iconfix.  Winstart runs programs from Windows we don't want.
rem      2)  Let tester know that there is a C:\ERROR.LOG that gets created
rem          by the SCRIPT program if there are SCRIPT errors.
rem      3)  Set env. variable ICONFIX=ERROR if SCRIPT errors - for mfg
rem 12)  1139941A, 11/07/94, RJC 1) Save/Restore "virgin" copy of
rem      \DOS\WNTOOLS.GRP so that launching Windows during fixup doesn't
rem      "lose" the icon properties for Microsoft Tools group.  Windows
rem      wants to re-establish icon properties during save on exit, but
rem      because the group file is not in current directory, it gets lost.
rem      This fixes the reported problem of the Microsoft Tools group
rem      icons being "wrong"
rem      2), HNH, Fix the windows\winstart.bat to just ren winstart.bat.
rem 13)  1139942a, 11/29/94, HNH
rem      1)  Remove lines that scripted the mscdex line below smartdrv.
rem      2)  Ft. Worth-Jory Irvine removed lines that ran windows.
rem      3)  Ft. Worth-Jory added arrange icons.
rem      4)  HNH - Pipe output to %log_file%.
rem 14)  1139943a, 01/09/95, HNH
rem      1)  Added more %log_file% to correct -942.
rem      2)  Updated SCRIPT.EXE to handle to NUL.
```

Fix$file.bat

```
rem 113994ja+ Add log_file or NUL support:
if "%log_file%" == "" set log_file=nul cd\windows\system
IF NOT EXIST VBRUN300.DLL COPY C:\TEMP\VBRUN300.DLL >> %log_file%
cd\
if exist c:\bootimg.exe call c:\bootimg W /fc:\boot.img >> %log_file%
if exist c:\bootimg.exe erase c:\bootimg.exe >> %log_file%
if exist c:\boot.img erase c:\boot.img >> %log_file%

:
if exist c:\tmpl\worldkbd.bat goto notebook
if exist c:\temp\ascentia.bat goto notebook
goto continue
:notebook
if exist c:\temp\powrmgmt.bat goto apmdone
rem Explode necessary Windows files to support APM, and notebook.bat/spu
rem files into \temp to be processed as normal
c:\temp\notebook.exe -d -o c:\ >> %log_file%
:apmdone
:continue cd\temp
rem This will do what INS_APPS.BAT used to do but we don't have to update
rem INS_APPS.BAT every time there's a new app!

cd\temp
rem ++++++++ hnh
rem This deletes an inaccurate portion of the embedding
section./ex=(exclusive)
delsectn c:\windows\win.ini c:\temp\win.new PBrush /ex >> %log_file%
copy c:\temp\win.new c:\windows\win.ini >> %log_file%
del c:\temp\win.new >> %log_file%
rem -------- hnh for %%f in (*.bat) do if exist %%f call %%f rem +++++++++ Glenn
rem This deletes compressed files in windows\system directory
cd \windows\system
if exist *.fo_ del *.fo_ >> %log_file%
if exist *.tt_ del *.tt_ >> %log_file%
if exist *.sc_ del *.sc_ >> %log_file%
if exist *.bm_ del *.bm_ >> %log_file%
rem ---------- Glenn
cd\temp REM 113942A+
REM  Jory 12/06/94 - Following line sets up the shell=MC.EXE line in
SYSTEM.INI
script sys_shel.spt >> %log_file%
REM 113942A- rem 1139940a+
if exist c:\error.log SET FIXUPERROR=ERROR
rem 1139940a+ rem +++++++ Section for Fiji 2.  If C:\ASTWORKS\nul exits if not exist c:\astworks\nul goto noAworks
```

*Fix$file.bat*  Page A-2

```
cd\windows rem NO astdb in main:
copy c:\temp\main.grp >> %log_file% rem Put astdb in accessories:
copy c:\temp\accessor.grp >> %log_file% rem NO astdb in startup:
copy c:\temp\startup.grp >> %log_file% cd\
rem 1139942a -  Removed scripting of msedex below smartdrv.

rem         ----------------------------------------------

:noAworks
REM Glenn ****** Merge *.reg files, arrange icons here
if exist c:\windows\reg.dat del c:\windows\reg.dat >> %log_file%
cd\
dir *.reg /a:h > reg.txt
cls
REM *************

REM 1139941A+
if exist c:\dos\wntools.grp copy c:\dos\wntools.grp c:\dos\wntools.sav >> %log_file% if exist c:\dos\wntools.sav copy c:\dos\wntools.sav c:\dos\wntools.grp >> %log_file%
if exist c:\dos\wntools.sav del c:\dos\wntools.sav >> %log_file%
REM 1139941A-

REM 1139942A+
REM Jory 12/06/94 - following line arranges icons in Program Manager
c:\temp\grpfiles >> %log_file%
REM 1139942A- rem 1139940a-
rem set focus to main=1: Changes progman.ini order= 4 3 2 1
c:\temp\pmsetfoc 1 >> %log_file% rem I (HH) moved makesave.bat into root because ASTWORKS section would
rem run it as a regular batch file which would copy the files to
rem c:\ast-works before Windows ran - which is not what we want.
call makesave
cd\
del makesave.bat >> %log_file%
cd temp
if exist *.* c:\removeit /q *.* >> %log_file%
cd..
rd temp
md temp rem The temp dir is removed because we don't want our .SPT files looked at.
rem If WORLDKBD.BAT exists or tmp2, then copy into TEMP for mfg can run it
rem after ICONFIX's FIXSFILE.BAT. Don't delete C:\TEMP after tmp2 in copied!

if not exist tmp2\*.* goto nofiles copy c:\tmp2\*.* c:\temp\*.* >> %log_file%
```

Fix$file.bat Page A-3

```
cd tmp2
if exist *.* c:\removeit eg *.* >> %log_file%
cd..
cd tmp1

:noTitles
del c:\removeit.exe >> %log_file% if not "fixupnostop"=="" if exist c:\error.log del c:\error.log >> %log_file%
if not "fixupnostop"=="" goto nostop
if exist c:\error.log echo Error - Read C:\ERROR.LOG for Script errors
if exist c:\error.log PAUSE
if exist c:\error.log type c:\error.log :nostop rem During ULM when log_file=NUL, don't say "All done!"

if "%log_file%" == "nul" goto noTalk
if "%log_file%" == "NUL" goto noTalk

@echo All Done with FIX$FILE.BAT!
:noTalk
rem end of file.
```

Fix$file.bat  Page A-4

```
//-----------------------------------------------------------
// File: Script.c
// Purpose: Updates any text file's lines with new ones.
// Called by: DOS command line prompt.  SCRIPT.EXE <file_name>, (e.g. SCRIPT
//            CONFIG.SYS).
// Calls: Supporting Script local functions
//
// History
//
// Date        Who       Descriptions
// --------    --------  ------------
// 6/18/90     J.L.      First release
//
// 7/92        Y.L.      Rel 1.00.01
//
//                       Enhancement:
//                       1. Path and file name of script file is now
//                          specified in the command line. It was
//                          hard coded that the script file must have
//                          a file name:"SCRIPT.WIN" and must be in
//                          "C:\WINDOWS" subdirectory.
//                       2. Steamline the codes.
//                       3. Add error handling routines to detect any
//                          abnormal cases.
//                       4. Add "APPEND" function. <keyword>++
//                       5. Add "INSERT BEFORE" function <keyword>=^
//                       6. Add comments and bug fixed.
//                       7. Display message while processing.
//
// 10/15/92    Y.L.      Rel 1.00.02
//
//                       Bugs fixed:
//                       1. Incorrect resize at case "insertion" for
//                          non-ini files.
//                       2. '[' may appear in the statement in .ini files.
//                       3. Don't create BAK files.
//
// 03/19/93    Y.L       Rel 1.00.03
//
//                       Enhancement:
//                       1. Add "INSERT BEFORE" function for .ini files.
// 09/24/93    Y.L.      Rel 1.00.04
//
//                       Changes:
//                       1. Rename original file to BAK file and rename
//                          it back to original if an error occurred.   YLK001a
// 09/24/93    HNH001       Rel 1.00.04
//                       2. If sucess, exit with a 0.            HNH001a
//                       3. Fix problem where it was running out of HNH001b
//                          file handles.
//                       4. Added check for environment variable check for
//                          Hard Disk Master Group "HDMGROUP=662". If this is
//                          true, and there is an error, then pause.  HNH001c
// 05/09/94    HNH002       1. Bumped RECMAXLEN from 144 to 200
// 10/15/94    HNH003 1139940A, 1) Added HDMGROUP=662 if needed.
//                              2) Make C:\ERROR.LOG if errors are found.
//                              3) Fix [section] in comments bug.  See: ORIG:
//
// 12/21/94    HNH004 1139945A, 1) Added log_file support to send msgs to nul.
//                    Error messages will still go to screen regardless.
//-----------------------------------------------------------

/* mbufpt -- the starting address in memory, msize = sizeof(script.win) */
/*                                                  + sizeof(????.ini)  */
/* msize is the size of (ssize+isize) */
/* mtail -- the last byte of a string in mbufpt, not the last byte of mbufpt
 */
```

*Script.c* Page A-5

```
/* ssize is the size of sizeof(script.win) file */
/* isize is the size of sizeof(?????.ini) file */
/* sbuf  is the buffer of a record from script.win file */
/* ininame is the buffer of ?????.ini filename */
/* secname is the buffer of section name from script.win file */
/* recsize is the length of a record from script.win file */
/* seclen  is the length of a section name */
/* EX:    _____        */
/*       |{| |w| i| n| d| o| w| s| |}|0d|0a| | | | | | | |        */
/*       |_|_|_|_|_|_|_|_|_|_|__|__|_|_|_|_|_|_|_|                */
/*                                                                */
/*  mbufpt points to the starting address of above buffer         */
/*  msize = 18                                                    */
/*  mtail = 11                                                    */
/*  winmode = 1 -- Windows text file format                       */
/*          = 0 -- non-Windows text file format                   */
/*  testmode = 1 -- entry name compare                            */
/*           = 0 -- section name compare                          */
/*----------------------------------------------------------------*/ include <dos.h>                        // HNH003 1139940A
include <fcntl.h>
#include <sys\types.h>
#include <sys\stat.h>
#include <io.h>
#include <stdio.h>
#include <ctype.h>
#include <string.h>
#include "astver.h"
include <stdlib.h>                     /* For getenv(),putenv() HNH001c */ define RECMAXLEN      144       // was 144. HNH define INPUT_ERROR    0x01
define LINE_ERROR     0x02
#define INI_ERROR      0x03
#define EQUSIGN_ERROR  0x04
#define NOEQU_ERROR    0x05
#define WRITE_ERROR    0x06
#define MEM_ERROR      0x07
#define SECTION_ERROR  0x08
#define NOFILE_ERROR   0x09
#define SCRIPT_ERROR   0x0A
define LEN_ERROR      0x0B char  *script;
char  *mbufpt;
long  msize,mtail,ssize,isize;
char  cbyte,sbuf[RECMAXLEN+1],ininame[80],secname[40];
int   hscript,hini,recsize,iniexist,secexist,seclen,winmode,testmode;
FILE  *fscript;
FILE  *ferr;               // HNH003, 1139941a revision Revision = { 0xFE, BANNER_AND_VERSION, COPYRIGHT };

// HNH001c+
int strcmp(const char *s1, const char *s2);
char *getenv(const char *name);
//int putenv(char *putenvstr);
// HNH001c- main(argc, argv)
int argc;
char *argv[];

{
    char  ch;
```

Script.c Page A-6

```c
if (stricmp(getenv("LOG_FILE"),"NUL") != 0)  {  // T:39943A, HNH004
    printf("%s\n",Revision.banner);
    printf("%s n\n",Revision.copyright);
}
//
// check if script file is specified in command line
//
if ( argc != 2 || (argv[1][0]=='/' && argv[1][1] == '?'))
    error(INPUT_ERROR);                        // display error and exit script=&argv[1][0];
iniexist=secexist=0;

if ((hscript=open(script,O_BINARY)) == -1)
    error(SCRIPT_ERROR);                       // display error and exit ssize=filelength(hscript);
close(hscript);
fscript=fopen(script,"rt");
recsize=getrec(fscript,sbuf);
while (!feof(fscript))
{
    ch=sbuf[0];
    switch(ch)   /* check the 1st byte */
    {
        case '[':   /* mbufpt will point to whole INI file in memory */
        case '%':   /* winmode = 0 -> non Windows */
            winmode = (ch=='%') ? 0 : 1;
            secexist=0;
            if (!iniexist)
                /*      iniexist will be off after write          */
                writeini();
                /*      iniexist will on, if OK after read        */
            readini();
            break;

case '/':
        case ';':
        case '\n':
        case '\0':
            break;

case ' ':
            error(LINE_ERROR);                 // display error and exit
            break;

case '|':
            if (!iniexist) error(NOFILE_ERROR);
            secexist=testmode=0;
            if(seclen=getsecname())            // get section name
            {
                if(compattern(mbufpt,mtail,secname,seclen)==-1)   //
                    secinsert();               // section not found
                else
                    secexist=1;                // found the section
            }
            break;

default:
            ((winmode==1)?procwin():procdos());
            break;
    }
    recsize=getrec(fscript,sbuf);
}
```

Script.c Page A-7

```
fclose(fscript);    /* close script.win file */
if (!inexist)
    /*      inexist will be off after write      */
    write-ini();

if (stricmp(getenv("LOG_FILE"),"NUL") != 0)        // 1139943A, HNH004
    printf("Process complete.\n");
exit(0);                                /* HNH001a */
}
```

```
}

/*******
* Function : getrec
* Purpose : Read one line from the script file. The length of the line cannot
*           be greater than RECMAXLEN and will be returned to the caller.
* Called by: main
* Calls   : C library functions.
*******/ getrec(handle,buf)                /* get one record from script file until */
FILE   *handle;                   /* eof or \n.  max record length =RECMAXLEN */
char   *buf;                      /* return record length to calling       */
    /* Read in one record according current handle position */
    /* return a ASCIIS string in buf */
{
    char  ch;
    int   i;
    int   iLen, j;        // knn, 2/8/95 ch=fgetc(handle);
    for (i=0;(i<RECMAXLEN)&&(feof(handle)==0) && (ch!='\n');i++)
    {
        buf[i]=ch;
        ch=fgetc(handle);
    } buf[i]='\0';

return(i);
}
```

Script.c

Page A-9

```
//--------------------------------------------
// Function : readini
// Purpose: Allocate memory and read the whole file into the memory.
// Called by: main
// Calls: getininame(), C library functions
//--------------------------------------------
readini()
{
    getininame();

close(hini);                              /* close any files. HNH001B */ if ((hini=open((char *)ininame,O_BINARY))==-1)
        error(INI_ERROR);                     // display error and exit
    else
    {/* set allocmemsize */
        isize=filelength(hini);               // get file size
        msize=isize+ssize;                    // total memory required
        mbufpt=(char *)malloc(msize*sizeof(char));  // allocate memory
        if (mbufpt == NULL)
            error(MEM_ERROR);                 // display error and exit memset(mbufpt,0x20,msize*sizeof(char));  // init memory
        lseek(hini,0L,SEEK_SET);
        read(hini,mbufpt,isize);              // read file to memory
        close(hini);                          // close file
        mtail=isize-1;                        // point to the end of file
        if (mbufpt[mtail]=='\x0a')
            mtail--;
        if (mbufpt[mtail]!='\n')
        /* append 0d 0a at the end if there are none */
            mbufpt[mtail+1]='\x0d';
            mbufpt[mtail+2]='\x0a';
            mtail+=2;
        }
        if (stricmp(getenv("LOG_FILE"),"NUL") != 0)  // 1139943A, HNH004
            printf("Updating file: %s ...... ",ininame);

iniexist=1;                           // file is in memory
    }
}
```

Script.c   Page A-10

```
// Function : writeini
// Purpose: Save file and rename the original file to .BAK file.
// Called by: main
// Calls: C library functions.
//------------------------------------------------ writeini()
{
    static char temp[80];                          // for .BAK filename
    char   *bakname_temp;
    char   *dotpt;
    int    hnewini;
    unsigned int   lcount;

// YLK001a+
//   1.00.02 - don't create backup file
//   /* rename existing .INI file to .BAK */
    bakname=strdup(ininame);
    dotpt=strchr(bakname,'.');
    dotpt[1]='B';
    dotpt[2]='A';
    dotpt[3]='K';
    dotpt[4]='\0';

if ((hnewini=open((char *)bakname,O_BINARY))!= -1)
        remove((char *)bakname);
    rename(ininame,bakname);

if ((hnewini=open((char *)ininame,O_BINARY))!= -1)
        remove((char *)ininame);
    hnewini=open((char *)ininame,O_CREAT|O_BINARY|O_WRONLY);
    mbufpt[++mtail]='\x01a';    /* insert EOF mark */
    if (write(hnewini,mbufpt,mtail)== -1)           // check if error
    {
        remove((char *)ininame);   /* Rename to original file. */
        rename(bakname,ininame);
// YLK001a-
        if (stricmp(getenv("LOG_FILE"),"NUL") != 0)     // 1139943A, HNH004
            printf("\n");
        error(WRITE_ERROR);                             // display error and exit
    }
    close(hnewini);
    rename(ininame,bakname);    /* HNH001c */
    remove((char *)bakname);    /* Delete .BAK file. HNH001c*/
    free(mbufpt);                                       // release memory
    if (stricmp(getenv("LOG_FILE"),"NUL") != 0)         // 1139943A, HNH004
        printf("Done\n");
    iniexist=0;
}
```

```
//------------------------------------------     ..............
// Function : getininame
// Purpose: Get the filename from the text file and put it in ININAME[].
// Called by: readini
// Calls: C library functions.
//.........   ...   ...   ..  ..        ........      ..............

getininame()
{
    int  sour,dest;

for(sour=1,dest=0;sbuf[sour]!='\0';sour++,dest++)
        ininame[dest]=sbuf[sour];
    ininame[dest]='\0';
}

//..........   .....  ....  ..  ..  ..  ..  ........................
// Function : getsecname
// Purpose: Get the section name from the text file and put it in SECNAME[]
//          The length of the section name is also returned to caller.
// Called by: main
// Calls: C library functions.
//..................   ..   ..   ..   ..   ..   ..  ..........  ..  ...........

getsecname()
{
    int  i,j,len;

len=strlen(sbuf);
    for(i=0,j=0; i<len; i++)
    {
        if (sbuf[i]=='[')
            j++;
        else if (sbuf[i]==']')
            j--;
        else;
    }
    if (j != 0) return(0);
    for(i=0; i<len; i++)
    {
        if (sbuf[i] == ']')
            break;
        secname[i]=sbuf[i];
    }
    secname[i]=sbuf[i];
    i++;
    secname[i]='\0';
    return(i);
}
```

*Script.c* Page A-12

}

```
/*---------------------------------------------------------
 * Function : chkrec
 * Purpose : Check if the record has an '=' sign
 * Called by: main
 * Calls: error() and C library functions
 *---------------------------------------------------------*/
chkrec()
{
    int    equsign;
    char   *ptequ;

ptequ=strchr(sbuf,'='); /* return zero if not found */
    if (ptequ)              /* '=' sign is found in sbuf[] */
    {
        equsign=ptequ-sbuf;
        if (sbuf[equsign-1] == ' ')
        /* || (recsize > equsign && sbuf[equsign+1] == ' ')) */
            error(EQUSIGN_ERROR);                   // display error and
exit
        else
            return(1);       /* record OK */
    }
    else
        error(NOEQU_ERROR);                         // display error and
exit
    return(0);
}
```

Script.c Page A-13

```
//------------------------
// Function : procwin
// Purpose: Read Windows section [ ]
// Called by: main
// Calls: compattern, readdelete, and C library functions.
//------------------------ procwin()
{
    long    secstart,secend,recstart,findstart,findend;
    long    i,j;
    int     equsign, equhere=0;
    char    *ptequ;

if (!iniexist) error(NOFILE_ERROR);
    if (!secexist) error(SECTION_ERROR);

chkread();

ptequ=strchr(sbuf,'=');
    equsign=ptequ-sbuf;     /* get the offset of '=' in sbuf[] */

/* secstart is the offset of a section relative to the beginning of mbufpt
    */
    /* EX: [Boot]0d0adisplay=0d0a[Windows]0d0a...secstart of [Windows] = 19 */
    /*     1234567 8 901234567 8 9*/
    /*     recstart of [Boot] = 7, seclen of [Boot] = 6, secend of [Boot]=8 */
    /* the following stmt is search mbufpt size-mtail to find the pattern */
    /* secname, pattern length=seclen, return secstart=offset pos in mbufpt */
    /* it is the pos of '[' in mbufpt
    /**************** secname exists for sure *******************/ testmode=0;
    secstart=compattern(mbufpt,mtail,secname,seclen);
    /* get section length from '['+1 to next '['-1 */

// orig:    for(i=secstart+seclen,j=0;mbufpt[i]!='[' && i <= mtail; i++,j++);

for(i=secstart+seclen,j=0;mbufpt[i]!='[' && i <= mtail; i++,j++)
// 1139940a++++++++++++++++++++++++++++ HNH
    {
        if (mbufpt[i]==' ' || mbufpt[i]==';') { // Skip any ' ' or ';' in
comments.
           i++;
           j++;
           if (mbufpt[i]!=0xd || mbufpt[i]!=0xa) { // Skip any CR or LF in
comments.
               i++;
               j++;
           }
        }
    }
// 1139940a------------------------ HNH //    for(i=secstart+seclen, j=0; i<=mtail; i++, j++)        // 1.00.02
//    {                                                       // 1.00.02
//        if (mbufpt[i]=='=') equhere=1;                      // 1.00.02
//        if (mbufpt[i]=='\n') equhere=0;                     // 1.00.02
//        if (mbufpt[i]=='[' && equhere==0) break;            // 1.00.02
//    }                                                       // 1.00.02
    testmode=1;
    recstart=compattern(&mbufpt[secstart+seclen],j,sbuf,equsign);
    secend=secstart+seclen+j;

while (mbufpt[secend-1] == 0xA && mbufpt[secend-2] == 0xD &&
           mbufpt[secend-3] == 0xA && mbufpt[secend-4] == 0xD)
```

Script.c Page A-14

```
        secend -2;
    if (recstart != 1)
    {
        if (sbuf[equsign+1]=='-')
            recdelete(secstart+seclen+recstart);
// 1.00.03 start
        else if (sbuf[equsign+1]=='+')
        {
            findstart=recstart+strlen(secname)+1;
            findstart+=compattern(&mbufpt[findstart],j,sbuf,equsign);
            findend=strlen(sbuf);
            recsize=findend-equsign-1;          // # of char to be moved
            for (i=0;i<recsize;i++)              // remove keyword
                sbuf[i]=sbuf[equsign+i+2];
            for(;(mbufpt[findstart]!='\n'|| findstart==0);findstart--);
            if (mbufpt[findstart]=='\n')         // insert after CR, LF
                findstart++;
            recsize--;
            middinsert(findstart);
        }
// 1.00.03 end
        else         /* replace = delete + insert */
        {
            recdelete(secstart+seclen+recstart);
            secend=secstart+seclen+recstart;
            (secend - mtail) ? endinsert() : middinsert(secend);
        }
    }
    else if (sbuf[equsign-1]=='#') /* next available number */
    {
        int   temp,max,num1,num2;
        char  asciibuf[5];
        max=0;
        testmode=0;
        for (i=secstart+seclen;i<secend;)
        {
            recstart=compattern(&mbufpt[i],j,sbuf,equsign-1);
            if (recstart!=-1)
            {
                num1=recstart+i+equsign-1;
                for (num2=0;mbufpt[num1]!='=';num1++,num2++)
                    asciibuf[num2]=mbufpt[num1];
                asciibuf[num2]='\0';
                temp=atoi(asciibuf);
                max=(max>temp)?max:temp;
                for (;mbufpt[num1]!='\n' && num1<secend;num1++);
                for (;mbufpt[num1]=='\n' && num1<secend;num1++);
                i=num1;
            }
            else
                i++;
        }
        max++;
        itoa(max,asciibuf,10);
        for(i=0;sbuf[i]!='#' && i<equsign;i++);
        /* if sbuf->group#=temp.grp, then equsign->7, i->6 */
        num1=recsize-i;
        for(j=0;j<num1;j++) sbuf[i+j]=sbuf[i+j+1];
        /* sbuf->group=temp.grp */
        recsize--;
        num2=strlen(asciibuf);
        for(j=0;j<num1;j++) sbuf[recsize+num2-j]=sbuf[recsize-j];/* move backwards */
        /* sbuf->group# =temp.grp */
        sbuf[recsize+num2+1]='\0';
        for(j=0;j<num2;j++)
```

Script.c Page A-15

```
            sbut[i+1]=asciibut[j];
        recsize+=num2;
        (seeend == mtail) ? endinsert() : middinsert(seeend);
        }
// 1.00.03 start
    else if (sbut[equsign+1]== '"')
            {
            findstart=bootlart+strlen(bootname)+1;
            findend=strlen(sbuf);
            recsize=findend-equsign-1;       // # of char to be moved
            for (i=0;i<recsize;i++)           // remove keyword
                sbut[i]=sbut[equsign+i+2];
            for(;(mbufpt[findstart]!='\n'|| findstart==0);findstart--);
            if (mbufpt[findstart]=='\n')      // insert after CR, LF
                findstart++;
            recsize--;
            middinsert(findstart);
            }
// 1.00.03 end
    else if (sbut[equsign+1]!='-')
        (seeend == mtail) ? endinsert() : middinsert(seeend);
    else;
    }
```

Script.c Page A-16

```c
//
// Function : procdos
// Purpose: Read DCS lines.
// Called by: main
// Calls: chkrec, error, compattern, recdelete, and C library functions
// procdos()
{
    long  findstart,findend,recstart,temptr;
    long  i,j;
    size_t equsign;
    char  *ptequ;

if (!ini=xist) error(NOFILE_ERROR);

chkrec();

ptequ=strchr(sbuf,'-');
    equsign=ptequ-sbuf;        /* get the offset of '-' in sbuf[] */
    winmode=0;
    findstart=compattern(mbufpt,mtail,sbuf,equsign);
    if(findstart!=-1)
    {
        switch (sbuf[equsign+1])
        {
            case '-':    /* deletion */
                if (findstart > 0)
                {
                    for(i=findstart-1;mbufpt[i]!='\n' && i > 0; i--);
                    findend=(i==020:i+1);
                }
                else
                    findend=0;
                recdelete(findend);
                break;

case '\n':
            case ' ':
            case '\0':
                break;

case '+':                        // append function
                findend=strlen(sbuf);
                recsize=findend-equsign-1;   // # of char to be moved
                for (i=0;i<recsize;i++)      // remove keyword
                    sbuf[i]=sbuf[equsign+i+2];
                for(;mbufpt[findstart]!='\n';findstart++);   // end of line
                temptr=findstart-1;
                for(;(mbufpt[temptr]!='\n'||temptr==0);temptr--);
                if (mbufpt[temptr]=='\n') temptr++;
                if ((findstart-temptr+recsize-1)>128) error(LEN_ERROR);
                findstart--;
                recsize--;
                append(findstart);
                break;

case '^':                        // insert before function
                findend=strlen(sbuf);
                recsize=findend-equsign-1;   // # of char to be moved
                for (i=0;i<recsize;i++)      // remove keyword
                    sbuf[i]=sbuf[equsign+i+2];
                for(;(mbufpt[findstart]!='\n'|| findstart==0);findstart--);
                if (mbufpt[findstart]=='\n')  // insert after CR, LF
                    findstart++;
                recsize--;
                middinsert(findstart);
```

*Script.c* Page A-17

```
                } break;

default:         /* insertion */
                        findend=strlen(sbuf);
                        recsize=findend-equsign-1;                  // 1.00.02 - # of
char to be moved
                        for (i=0;i<recsize;i++)
                            sbuf[i]=sbuf[equsign+i+1];
                        for(;mbufpt[findstart]==' ';findstart++);
                        for(;mbufpt[findstart]=='\n';findstart++);
                        if (findstart >= mtail)
                            endinsert();
                        else
                            middinsert(findstart);
                        break;
            }
        }
        else
        {
            switch (sbuf[equsign+1])
            {
                case '=':
                case '\n':
                case ' ':
                case '+':
                    break;

case '-':
                    findend=strlen(sbuf);
                    recsize=findend-equsign-1;
                    for (i=0;i<recsize;i++)
                        sbuf[i]=sbuf[equsign+i+2];
                    recsize--;
                    middinsert(0);
                    break;

default:
                    findend=strlen(sbuf);
                    recsize=findend-equsign-1;                  // 1.00.02 - # of
char to be moved
                    for (i=0;i<recsize;i++)
                        sbuf[i]=sbuf[equsign+i+1];
                    endinsert();
                    break;
            }
        }
    }
}
```

Script.c  Page A-18

```
/* Function : append
/* Purpose: Append the text in SBUF[] to MBUFPT[] at the position specified
/*          by POS.
/* Called by: procdos
/* Calls: None.
*/ append(pos)
long pos;
{
    long end,i,j;
    int  len;

end=mtail+recsize;         /* # of char to be moved */
    len=mtail-pos+1;
    for(i=0;i<len;i++)
       mbufpt[end-i]=mbufpt[mtail-i];
    i=pos;
    for(j=0;j<recsize;j++)
       mbufpt[i+j]=sbuf[j];
    mtail=end;
}

/* Function : middinsert
/* Purpose: Append the text in SBUF[] to MBUFPT[] at the position specified
/*          by POS.
/* Called by: procdos
/* Calls: None.
*/ middinsert(pos)       /* record insert into 'pos' */
long pos;
{
    long end,i,j;
    int  len;

end=mtail+recsize+2;/* size to move+0d+0a */
    len=mtail-pos+1;
    for(i=0;i<len;i++)
       mbufpt[end-i]=mbufpt[mtail-i];
    i=pos;
    for(j=0;j<recsize;j++)
       mbufpt[i+j]=sbuf[j];
    mbufpt[i+j]='\x0d';
    mbufpt[i+j+1]='\x0a';
    mtail=end;
}
```

```
//----------------------------------------
// Function : endinsert
// Purpose: Append the text in CBUF[] to MBUFPT[].
// Called by: procdos
// Calls: None
//---------------------------------------- endinsert()
{
    int   i;

for(i=0;i<=recsize;i++)
        mbufpt[mtail+i]=cbuf[i];
    mbufpt[mtail+i]='\x00d';
    mbufpt[mtail+i+1]='\x00a';
    mtail=mtail+recsize+2;
}
//----------------------------------------
// Function : recdelete
// Purpose: Delete the text in MBUFPT[] from the position specified by POS.
// Called by: procdos, procwin
// Calls: None
//---------------------------------------- recdelete(pos)  /* pos=starting offset of a deleting entry in mbufpt */
long  pos;
{
    long  i,j;
    int   len;

for(len=0,i=pos;i<mtail;len++,i++) /* find entry length until \n */
        if(mbufpt[i]=='\n')
            break;
    /* plus the subsequent \n */
    for(;mbufpt[i]=='\n';len++,i++);
    for(i=pos,j=0;i<=mtail;i++,j++)
        mbufpt[pos+j]=mbufpt[pos+len+j];
    mtail=mtail-len;
    for(i=(mtail+1);i<msize;i++)   /* clear rest of buffer with blank */
        mbufpt[i]='\0';
}
```

*Script.c* Page A-20

```
/*-----------------------------------------------------------------
  Function : compattern
  Purpose: Compare two strings pointed by PATT1, PATT2. Lengths of the
           strings are PATT1LEN and PATT2LEN. If matched, it returns the
           offset of the string in PATT1
  Called by: prosdos, prowin
  Calls: C library calls.
-------------------------------------------------------------------*/
compattern(patt1,patt1len,patt2,patt2len)
char  *patt1,*patt2;
long  patt1len;
int   patt2len;
{
   char  *ptr1, *ptr2;
   int   i,j,ch1,ch2;

ptr1=patt1;
   for(i=0; i<patt1len; i++)
   {
      ptr2=patt2;
      ch1=toupper(ptr1[i]);
      ch2=toupper(ptr2[0]);
      if (ch1==ch2)
      {
         for(j=0; j<patt2len; j++)
         {
            ch1=toupper(ptr1[i+j]);
            ch2=toupper(ptr2[j]);
            if (ch1==ch2)
               continue;
            else
               break;
         }
         if (j==patt2len)
         { /* testmode equals 0 - section name compare */
            if (!winmode || !testmode) return(i); /* DOS mode or section */
            ch1=ptr1[i-1]; /* if it is unique */
            ch2=ptr1[i+j];
            if (ch1=='\n' && ch2=='.')
               return(i);
         }
      }
   }
   return(-1);            /* no match */
}
```

Script.c Page A-21

```
//............                     ..........
// Function : secinsert
// Purpose:  Insert the section.
// Called by: procdos, procwin
// Calls: C library calls.
//............

secinsert()
{ sbuf[0]=0xD;                          // separate the new section from the others
    sbuf[1]=0xA;
    for(recsize=2;secname[recsize-2]!='\0';recsize++)    // move section name
to SBUF[]
        sbuf[recsize]=secname[recsize-2];
    endinsert();                          // append it to the end
    while(recsize=getrec(fscript,sbuf))   // get next record
    {
        switch(sbuf[0])
        {
            case '{':                     // next file
            case '}':                     // next section
                return;

case '/':                     // comments
            case ';':
                break;

default:                      // append others to the end
                endinsert();
                break;
        }
    }
}
```

*Script.c* Page A-22

```c
/*-------------------------------------------------
** Function: error
** Purpose: Display the error message
** Called by: main
** Calls: C library calls
**-------------------------------------------------*/
error(code)
int  code;
{
char c;                    /* HNH001 */
FILE *fh;
int  errInit=0;
char *errLine;
char time[9],date[9];
char ia[3];
// 113994UA++++++++++++++++
    if (!errInit) {
        ferr = fopen("\\error.log","a+t");      // Append to the file
        errInit=1;
    }
    printf("\nError code: %d\n",code);
    _strdate(date);
    strcpy(errLine,"\n   ");
    strcat(errLine,date);
    strcat(errLine,"   ");
    _strtime(time);
    strcat(errLine,time);
    fputs(errLine,ferr);
    fputs("                AST Script Error log (ICONFIX)",ferr);
    strcpy(errLine,"\n\nError # ");
    itoa(code,ia,10);
    strcat(errLine,ia);
    strcat(errLine," in script file. ");
    strcat(errLine,script);                     // Get file name.
    fputs(errLine,ferr);
    strcpy(errLine,"\nError line: ");
    strcat(errLine,sbuf);
    fputs(errLine,ferr);
// 113994UA---------------
    fputs("\n--------------------\n",ferr);
    switch(code)
    {
        case  INPUT_ERROR:
            printf("Usage: SCRIPT <filename>\n");
            strcpy(errLine,"Usage: SCRIPT <filename>\n");
            break;

case  LINE_ERROR:
            printf("Error\n\nInvalid character at column 1\n--- %s\n",sbuf);
            strcpy(errLine,"Error\n\nInvalid character at column 1\n--- \n");
            strcat(errLine,sbuf);
            break;

case  INI_ERROR:
            printf("Error\n\nCannot open file %s\n",ininame);
            strcpy(errLine,"Error\n\nCannot open file \n");
            strcat(errLine,ininame);
            break;

case  EQUSIGN_ERROR:
            printf("Error\n\nInvalid character following '=' sign.\n--- %s\n",
                   sbuf);
            strcpy(errLine,"Error\n\nInvalid character following '=' sign.\n--- \n");
            strcat(errLine,sbuf);
            break;
```

Script.c  Page A-23

```
    case  NOEQU_ERROR:
          printf("Error\n\nMissing '=' sign.\n--> %s\n",sbuf);
          strcpy(errLine,"Error\n\nMissing '=' sign.\n--> %s\n");
          strcat(errLine,sbuf);
          break;

case  MEM_ERROR:
          printf("Error\n\nInsufficient memory.\n");
          strcpy(errLine,"Error\n\nInsufficient memory.\n");
          break;

case  WRITE_ERROR:
          printf("Error\n\nFailed to save file %s.\n",ininame);
          strcpy(errLine,"Error\n\nFailed to save file .\n");
          strcat(errLine,ininame);
          break;

case  SECTION_ERROR:
          printf("Error\n\nMissing section name.\n--> %s\n",sbuf);
          strcpy(errLine,"\nMissing section name.\n");
          strcat(errLine,sbuf);
          break;

case  NOFILE_ERROR:
          printf("Error\n\nMissing file name.\n--> %s\n",sbuf);
          strcpy(errLine,"Error\n\nMissing file name.\n--> \n");
          strcat(errLine,sbuf);
          break;

case  SCRIPT_ERROR:
          printf("Error: Cannot open file %s\n",script);
          strcpy(errLine,"Error: Cannot open file \n");
          strcat(errLine,script);
          break;

case  LEN_ERROR:
          printf("Error\n\nLine too long.\n");
          strcpy(errLine,"Error\n\nLine too long.\n");
          break;
    }
    fputs(errLine,ferr);

if (stricmp(getenv("LOG_FILE"),"NUL") != 0)        // 1139943A, HNH004
       printf("%c",0x7);

/* HNH002c+ No Pausing only if HDM group test has HDMGROUP=662 */ if (strcmp(getenv("HDMGROUP"),"662") == 0) {
        fputs("\n---------------------- End of Log File -------------------------",ferr);
        fclose(ferr);            /* close C:\ERROR.LOG file. */
        printf("\n\n*** Notice to Testing Group *** \n");
        printf("\nThere was a problem running SCRIPT.  Besides the .SPT");
        printf("\nfile having syntax errors, there may not be enough memory.");
        printf("\nnor some files are missing.  Please read the C:\\ERROR.LOG.");
        printf("\nCall Hard Disk Master Group or your manager.\n");
        printf("\n\n Press <Enter> to continue...");
        printf("\n");
        close(hini);         /* close any files. */
        h=fopen("con","r");  /* Input file was re-directed.  Re-open it */
        printf("%c",0x7);
        c=getch(stdin);              /* Pause */
    }
/* HNH001c- */ exit(code);
} // end of file.
```

Script.c Page A-24

ATIM64.BAT

Script atim64.spt

ATIM64.SPT

```
;ATI Mach64 V1.4 script file, 2/2/95
;AST Research, 1995. HN Harding

%c:\AUTOEXEC.BAT
PATH=+;C:\MACH64

$c:\windows\PROGMAN.INI
[Groups]
Group#=C:\WINDOWS\ATIDESK.GRP $c:\windows\CONTROL.INI
[drivers.desc]
atirle.drv=ATI RLE Video Compressor
ativdacc.drv=ATI Video Accelerator
ativideo.drv=ATI Video Driver $c:\windows\SYSTEM.INI
[boot]
386grabber=macx.3gr
display.drv=macx.drv

[boot.description]
displayinf=OEMMACX.INF
display.drv=mach64 Driver

[386Enh]
display=macxvdd.386

[drivers]
VIDC.CVID=ativdacc.drv
VIDC.MSVC=ativdacc.drv
VIDC.IV31=ativdacc.drv
VIDC.MRLE=ativdacc.drv
VIDC.RT21=ativdacc.drv
VIDC.YVU9=ativdacc.drv ATIVIDEO=ativideo.drv
VIDC.RLE=ativdacc.drv
VIDC.DIB=ativdacc.drv

[Installable Compressors]
vidc.rle=ativdacc.drv

[ATI Interceptor]
MSVC=msvidc.drv
RT21=ir21_r.dll
IV31=ir30.dll
CVID=iccvid.drv
RLE=atirle.drv
MRLE=msrle.drv
```

Page A-26

ATIM64.SPT

```
YVU9=ir21_r.dll

[Macx]
DesktopSize=640x480
Dithering=on
Environment=Small Font
PaletteManager=on
PixelDepth=8
ScreenSize=640x480
VGADither=off %c:\windows\WIN.INI
load=+ C:\ATI\ATIDESK\ATIKEY.EXE
```

APPENDIX B

```
rem File: AUTOEXEC.BAT.

@ECHO OFF
C:\DOS\SMARTDRV.EXE 8048 4096
PROMPT $p$g
SET COMSPEC=C:\MISC\COMMAND.COM
SET TEMP=C:\ULM
rem Let user choose which language.
c:\ulm\ulmmain.bat
rem eof.
```

*AUTOEXEC.BAT* Page B-1

```
@echo off
rem ULM main file. HNH, 11/04/95, 12/06/94
rem Calls 1) ULM.EXE main program and fix$file.bat.

set log_file=nul
if "%log_file%" == "" set log_file=nul
c:
cd\ulm
set path=c:\ulm
cls
if exist ulmload.bat del ulmload.bat > %log_file%
ulm.exe
if errorlevel 214 goto reboot
if errorlevel 63 goto backdoor
if not exist ulmload.bat goto reboot
rem ULMLOAD.BAT must exist at this point - user chose local lang.
c:
cd\
c:\ulm\ast_fa /h- /r- /s- *.* >> %log_file% percentd 1 c:\ulm\ulmload.txt
rem First del USA himem.sys and smartrv.exe:
del c:\dos\himem.sys >> %log_file%
del c:\dos\smartdrv.exe >> %log_file%
rem whatever files were put in c:\ dos and win - copy them.
md dostemp
if exist dos\*.* copy dos\*.* dostemp\*.* >> %log_file%
md wintemp
md wintemp\system
if exist windows\*.* copy windows\*.* wintemp\*.* >> %log_file%
if exist windows\system\*.* copy windows\system\*.* wintemp\system\*.* >> %log_file%
md roottemp
if exist *.* copy *.* roottemp\*.* >> %log_file%
rem del ulm & USA IO.SYS, MSDOS.SYS, config.sys, autoexec.bat:
del roottemp\IO.SYS >> %log_file%
del roottemp\MSDOS.SYS >> %log_file%
del roottemp\CONFIG.SYS >> %log_file%
del roottemp\AUTOEXEC.BAT >> %log_file%
rem ---------------------- call main ulm batch file for this lang:
percentd 2 c:\ulm\ulmload.txt
cd\
cd ulm
rem This explodes the user-chosen localized DISKHMs: (DOS, Win & Suppl):
rem The root dir MUST be 100% empty except for subdirs (for IO.SYS to be 1st)

rem ULMLOAD.BAT is created by ulm.exe from user chosing a lang:
call ulmload.bat
cd\
rem Pretend WIN was loaded 1st & put back previous files on top of Win:
if exist dostemp\*.* copy dostemp\*.* dos\*.* >> %log_file%
if exist wintemp\*.* copy wintemp\*.* windows\*.* >> %log_file%
if exist wintemp\system\*.* copy wintemp\system\*.* windows\system\*.* >> %log_file%
if exist roottemp\*.* copy roottemp\*.* >> %log_file%
```

*ULMMAIN.BAT* Page B-2

```
cd\wintemp\system
if exist *.* removeit /q *.* >> %log_file%
cd..
if exist *.* removeit /q *.* >> %log_file%
cd\
rd wintemp percentd 10 c:\ulm\ulmload.txt call fix$file cls
CD\
if exist c:\fix$file.bat del c:\fix$file.bat >> %log_file%
cd ulm\images
if exist *.* removeit /q *.* >> %log_file%
cd..
rd images
cd\ cd dostemp
if exist *.* removeit /q *.* >> %log_file%
cd\
rd dostemp cd roottemp
if exist *.* removeit /q *.* >> %log_file%
cd\
rd roottemp rem 01/25/95, HNH - Copy new (non-echoing) SCRIPT.EXE to c:\runtemp:
if not exist c:\runtemp\script.exe goto noScript
if exist c:\temp\script.exe copy c:\temp\script.exe c:\runtemp >> %log_file%
:noScript if exist c:\run$file.bat call c:\run$file.bat
if exist c:\run$file.bat del c:\run$file.bat >> %log_file% rem Call cleanup and don't return!
c:\misc\clnnboot.bat

:reboot
rem no reason for user to look at system - reboot.
c:\misc\reboot.exe
:backdoor rem End of file.
```

*ULMMAIN.BAT* Page B-3

```
// ULMPICK.CPP    (ULM.EXE). For AST Universal Language Master (ULM).
// Purpose: Allows user to pick which language to convert their system.
// Inputs: None.
// Calls: screen1() and system() for DOS command to reboot.
// Called By: AUTOEXEC.BAT at system boot up first time.
// Returns: 1: A value 1-7 fir lang/kbd combo or reboot value.
// Jan 05, 1996   Henry Harding, (c) 1995 AST Research, Inc.

#include <bios.h>
#include <stdio.h>
#include <stdlib.h>
#include <conio.h>
#include <dos.h>
#include <string.h>
include <graph.h> define MAXINTR   4        // FR, GR, IT & EN INTRUCTIONS.
define MAXKBDS   7        // SG, SF, SI/SG, SI/SF, IE/IE, IE/SG, IE/SF INTRUCTIONS.
                           //  1   2   3      4      5      6      7
#define ctrlC     -1       // ctrl+break;
#define ctrlBreak  3       // ASCII CODE.
#define creturn   13       // <CR>
#define aOne      49
#define aTwo      50
#define aThree    51
#define aFour     52
#define aFive     53
#define aSix      54
define aSeven    55 define ESCAPE    27-48    // constant for ASCII '1'.
define ASTEXIT   63-48    // AST mfg method to exit without rebooting (Press '?' w/ '1').

int getKey(int keyRead);   // Gets a ketstroke from user.

void french1(void);
void french2(void);
void french3(void);
void french4(void);

void german1(void);
void german2(void);
void german3(void);
void german4(void);

void italian1(void);
void italian2(void);
void italian3(void);
void italian4(void);

void english1(void);
void english2(void);
void english3(void);
void english4(void);

int screen1(void);    // Returns a 0 (Zero) to exit program.

int screen2(int);     // Returns a 27 (Escape) if user Escapes from screen 2.

int keyRead;          // Trap CTRL+C and CTRL+BREAK;

FILE *fp;             // Common to all functions.
```

ULMPICK.CPP  Page B-4

```
}

//////////////////////////////////////////////////////////////////////////////
int main()
{
    int i=0, iKbd=0;

while (ESCAPE == 27) {  // Main loop.
        i = screen1();

if (i == ASTEXIT)
            return ASTEXIT;         // OK for AST people to exit to DOS.
        if (i == 0)
            system("\\misc\\reboot.exe 173");  // User pressed Esc to exit ULM - reboot.
            return i;               // User pressed 0 (zero) to exit program.
        if (i == ESCAPE)
            system("\\misc\\reboot.exe 173");  // User pressed Esc to exit ULM - reboot
            return ESCAPE;          // User pressed Escape to exit program.

iKbd = screen2(i);          // Returns a 27 (Escape) if user Escapes from screen 2.
        if (iKbd != ESCAPE)
            return iKbd;            // If no Escape, program is done.  Exit.
    }
} // end fn main
```

ULMPICK.CPP  Page B-5

```
//////////////////////////////////////////////////////////////////////
// Purpose: Get keystroke
// Called by: main.
// Calls: getKey(int)
// Inputs: None (void)
// Returns: A keyboard code to exit, or reboot or continue.
// 01/05/96 - Henry Harding, AST Research, Inc.

int screen1(void)
{
  int i=-1, ic, k=-1;

while (k<0 || k>MAXINTR) {
     _settextcolor(15);
     _setbkcolor(1);
     _clearscreen(_GCLEARSCREEN);
     printf("                              (c) 1996  AST Computer\n");

german1();          // First intro screen.
     french1();
     italian1();
     english1();

printf("\n----- ");

ic = getKey(keyRead) - 48; //get keystroke then subtract 48 to get ordinal value.
     i = ic;
        if (ic == ASTEXIT)
           return ic;             // EXIT LOOP AND PROGRAM - GO TO DOS WITHOUT REBOOTING.

if (ic == ESCAPE)
           return ic;

if ((ic>0 && ic<=MAXINTR)) {
           switch (i) {
              case 1: {german3(); break;}
              case 2: {french3(); break;}
              case 3: {italian3(); break;}
              case 4: {english3(); break;}
           } printf("\n\n----- ");

ic = getKey(keyRead) - 48; //get keystroke then sub. 48 to get ordinal value.
           k = ic;

if (ic == ESCAPE)
              return ic;

if (k == 0)
              return k;

if (k != i)
              k = -1;                                // LOOP AGAIN.  ERROR.
           if (k<0 || k>MAXINTR)
              k = -1;                                // LOOP AGAIN.  ERROR.

} // if (i>0 && ic<=MAXKBDS)
   } // while (k<0 || k>MAXINTR)
   return k;
} // End of fn. screen1.
```

ULMPICK.CPP  Page B-6

```
//////////////////////////////////////////////////////////////////
// Purpose: Prepare screen two and get confirmation from user for language.
// Called by: main.
// Calls: getKey(int).
// Inputs:  Integer for language instructions: 1-4.
// Returns: A keyboard code to exit, redo or a language and kbd combo 1-7.
// 01/05/95    Henry Harding, ACR Research, Inc.

int screen2(int i)
{
  int ic=0, j, k;

j = 1;
  while (j<=0 || j>=MAXKBDS) {
      clearscreen(_GCLEARSCREEN);

switch (i) {
          case 1: (german2(); break;)
          case 2: (french2(); break;)
          case 3: (italian2(); break;)
          case 4: (english2(); break;)
      } printf("\n\n---- ");

ic = getKey(keyRead) - 48; // get keystroke then sub 48 to get ordinal value.
      j = ic;

if (ic == ESCAPE)
              return ESCAPE;

if (j>0 && j<=MAXKBDS) {
          switch (i) {
            case 1: (german3(); break;)
            case 2: (french3(); break;)
            case 3: (italian3(); break;)
            case 4: (english3(); break;)
          }
          printf("\n\n---- ");

ic = getKey(keyRead) - 48; //get keystroke then subract 48 to get ordinal value.
          k = ic;
          if (ic == ESCAPE)
                  return ESCAPE;

if (k == 0)                 // exit program.
              return j;
          if (k != j)
              j = -1;                           // LOOP AGAIN.  ERROR.
          if (k<0 || k>MAXKBDS)
              j = -1;                           // LOOP AGAIN.  ERROR.
      } // if (j>0 && j<=MAXKBDS)
```

ULMPICK.CPP  Page B-7

```
// The following switch statement will create a ULMLOAD.BAT file that
// contains the localized DISKHMS for DOS2Win to create a ULMERR.BAT file that
// is the batch file that will get run at FIX$FILE times. This section allows any batch
// file called ULMLOAD.BAT to run any number of explosions to drive ???.

if (j>0 && j<=MAXKBDS) {
          switch (k) {
            case 1: {system("copy GERMAN.bat ulmload.bat >> %log_file%");
                     system("copy kbd1.bat c:\\temp\\ulmkbd.bat >> %log_file%"); break;}
            case 2: {system("copy FRENCH.bat ulmload.bat >> %log_file%");
                     system("copy kbd2.bat c:\\temp\\ulmkbd.bat >> %log_file%"); break;}
            case 3: {system("copy ITALIAN.bat ulmload.bat >> %log_file%");
                     system("copy kbd3.bat c:\\temp\\ulmkbd.bat >> %log_file%"); break;}
            case 4: {system("copy ITALIAN.bat ulmload.bat >> %log_file%");
                     system("copy kbd4.bat c:\\temp\\ulmkbd.bat >> %log_file%"); break;}
            case 5: {system("copy ENGLISH.bat ulmload.bat >> %log_file%");
                     system("copy kbd5.bat c:\\temp\\ulmkbd.bat >> %log_file%"); break;}
            case 6: {system("copy ENGLISH.bat ulmload.bat >> %log_file%");
                     system("copy kbd6.bat c:\\temp\\ulmkbd.bat >> %log_file%"); break;}
            case 7: {system("copy ENGLISH.bat ulmload.bat >> %log_file%");
                     system("copy kbd7.bat c:\\temp\\ulmkbd.bat >> %log_file%"); break;}
          }
        }

} // while (j>0 && j<=MAXKBD)

fp = fopen("c:\\ulm\\ulmload.txt","w+");    // File that gets displayed during explode.

switch (i) {
        case 1: {german4(); break;}
        case 2: {french4(); break;}
        case 3: {italian4(); break;}
        case 4: {english4(); break;}
     }
     fclose(fp);

return k;                     // return errorlevel to batch file for debug.
} // end of fn screen2.
```

ULMPICK.CPP Page B-8

```
//////////////////////////////////////////////////////////////////
* Purpose: Prepare screen sws and get confirmation from user for language.
* Called by: screen1 and screen2.
* Inputs: None.
* Returns: A keyboard code f. exit, reboot or a language and kbd combo 1-7.
* 01/05/96  Henry Harding, ACT Research, Inc.

int getKey(int keyRead)
{
    int i=0;

while (i < 123450) {
        keyRead = bios_keybrd(_KEYBRD_READ);      // trap routine and ctrl-break;
        keyRead = keyRead & 0xff;                 // get low byte.
        if ((keyRead != ctrlBreak) && (keyRead != ctrlC) && (keyRead != creturn)) {
            _putch(keyRead);
            break;
        }
    }
    return keyRead;
}
```

*ULMPICK.CPP* Page B-9

```
The following functions draw boxes on the screen in special characters for the screen void german1(void)
{
printf("\n!!!!!!!!!!!!!!!!!!!!!!!!!!!!!!!!!!!!!!!!!!!!!!!!!!!!!!!!!!!!!!!!!!!!!!!"
);
printf("\nHerzlich willkommen. Sie haben jetzt die Möglichkeit, Ihren Computer mit der");
printf("\ngewünschten Sprache und Tastatur zu konfigurieren.");
printf("\n... Bitte drücken Sie 1 für die entsprechenden Anweisungen auf deutsch ");
} void german2(void)
{
printf("\n\nBevor Sie diesen Computer benützen, müssen Sie die entsprechende");
printf("\nSprach- und Tastatur-Version selektionieren.");
printf("\n\nIhre Wahl ist definitiv. Sie werden gebeten, Ihre Wahl zu bestätigen.");
printf("\n####################################################################"
");
printf("\n    "
Ê!!!!!!!!!!!!!!!!!!!!!!!!!!!!!!!!!!!!!!!!!!!!!!!!!!!!!!!!!!!!!!!!!!!!!!!*");
printf("\n    * Drücken Sie 1 für deutsche Sprache und Deutschschweizer Tastatur      *");
printf("\n    * Drücken Sie 2 für französische Sprache und Welschschweizer Tastatur   *");

printf("\n    * Drücken Sie 3 für italienische Sprache und Deutschschweizer Tastatur  *");
printf("\n    * Drücken Sie 4 für italienische Sprache und Welschschweizer Tastatur   *");
printf("\n    * Drücken Sie 5 für englische Sprache und Amerikanische Tastatur        *");
printf("\n    * Drücken Sie 6 für englische Sprache und Deutschschweizer Tastatur     *");
printf("\n    * Drücken Sie 7 für englische Sprache und Welschschweizer Tastatur      *");
printf("\n    Ê!!!!!!!!!!!!!!!!!!!!!!!!!!!!!!!!!!!!!!!!!!!!!!!!!!!!!!!!!!!!!!!!!!!!!%");
} void german3(void)
{
printf("\nBitte bestätigen Sie nochmals Ihre Wahl, oder drücken Sie 0 für exit.");
} void german4(void)
{
//fputs("\nDies dauert einige Minuten. Ihr Computer wird automatisch neu gestartet.",fp);
//fputs("\nBitte schalten Sie Ihren Computer während dieser Anpassung nicht aus.",fp);
fputs("\n\n
Ê!!!!!!!!!!!!!!!!!!!!!!!!!!!!!!!!!!!!!!!!!!!!!!!!!!!!!!!!!!!!!!!!!!!!!!!*",fp);
fputs("\n  * Dies dauert einige Minuten. Ihr Computer wird automatisch neu gestartet.
*",fp);
fputs("\n  *
*",fp);
fputs("\n  * Bitte schalten Sie Ihren Computer während dieser Anpassung nicht aus.
*",fp);
fputs("\n
Ê!!!!!!!!!!!!!!!!!!!!!!!!!!!!!!!!!!!!!!!!!!!!!!!!!!!!!!!!!!!!!!!!!!!!!!!%",fp);
}
```

ULMPICK.CPP  Page B-10

```
//////////////////////////////////////////////////////////////////////
void french1(void)
{
printf("\n!!!!!!!!!!!!!!!!!!!!!!!!!!!!!!!!!!!!!!!!!!!!!!!!!!!!!!!!!!!!!!!!
");
printf("\n\nBienvenue. Vous avez maintenant la possibilité de configurer votre ordinateur");
printf("\navec la langue et le clavier de votre choix.");
printf("\n\n*** Veuillez presser 2 pour les instructions en français.");
} void french2(void)
{
printf("\n\nAvant d'utiliser cet ordinateur vous devez choisir la langue et le clavier.");
printf("\n\nVotre choix sera définitif. Vous êtes demandé de reconfirmer votre choix.");
printf("\nооооооооооооооооооооооооооооооооооооооооооооооооооооооооооооооооооооо
");
printf("\n\n\n
É!!!!!!!!!!!!!!!!!!!!!!!!!!!!!!!!!!!!!!!!!!!!!!!!!!!!!!!!!!!!!!!!");
printf("\n * Veuillez presser 1 pour la langue allemande et le clavier suisse allemand
*");
printf("\n * Veuillez presser 2 pour la langue française et le clavier suisse romand
*");
printf("\n * Veuillez presser 3 pour la langue italienne et le clavier suisse allemand
*");
printf("\n * Veuillez presser 4 pour la langue italienne et le clavier suisse romand
*");
printf("\n * Veuillez presser 5 pour la langue anglaise et le clavier americain
*");
printf("\n * Veuillez presser 6 pour la langue anglaise et le clavier suisse allemand
*");
printf("\n * Veuillez presser 7 pour la langue anglaise et le clavier suisse romand
*");
printf("\n
È!!!!!!!!!!!!!!!!!!!!!!!!!!!!!!!!!!!!!!!!!!!!!!!!!!!!!!!!!!!!!!!!¼");
} void french3(void)
{
printf("\nVeuillez confirmer votre choix, ou presser 0 pour quitter.");
} void french4(void)
{
//fputs("\nCeci va durer quelques minutes. Votre ordinateur va redémarrer
automatiquement.",fp);
//fputs("\nVeuillez ne pas éteindre l'ordinateur durant cette opération.",fp);
fputs("\n\n
É!!!!!!!!!!!!!!!!!!!!!!!!!!!!!!!!!!!!!!!!!!!!!!!!!!!!!!!!!!!!!!!!»",fp);
fputs("\n        * Ceci va durer quelques minutes. Votre ordinateur va         *",fp);
fputs("\n        * redémarrer automatiquement.                                 *",fp);
fputs("\n        *                                                             *",fp);
fputs("\n        * Veuillez ne pas éteindre l'ordinateur durant cette opération. *",fp);
fputs("\n        È!!!!!!!!!!!!!!!!!!!!!!!!!!!!!!!!!!!!!!!!!!!!!!!!!!!!!!!!!!!!¼",fp);
}
```

*ULMPICK.CPP* Page B-11

```
//////////////////////////////////////////////////////////////////
void italian1(void)
{
printf("\nEfffffffffffffffffffffffffffffffffffffffffffffffffffffffffff");
printf("\nBenvenuto. Il Vostro computer ha la possibilità di lavorare in diverse lingue.");
printf("\nutilizzando la tastiera adatta al linguaggio selezionato.");
printf("\n... Premi 3 per istruzioni in italiano.");
} void italian2(void)
{
printf("\nLa selezione del linguaggio e della tastiera devono essere fatte prima");
printf("\ndell'utilizzo del computer ");
printf("\nLa scelta è permanente. La scelta prima di essere accettata sarà verificata.");
printf("\nDDDDDDDDDDDDDDDDDDDDDDDDDDDDDDDDDDDDDDDDDDDDDDDDDDDDDDDDDDDDDDDDDDDDDDDDDD");

printf("\n\n\n     Efffffffffffffffffffffffffffffffffffffffffffffffffffffx");
printf("\n         * Premi 1 per lingua tedesca e tastiera Svizzera-Tedesca    *");
printf("\n         * Premi 2 per lingua francese e tastiera Svizzera-Romanda   *");
printf("\n         * Premi 3 per lingua italiana e tastiera Svizzera-Tedesca   *");
printf("\n         * Premi 4 per lingua italiana e tastiera Svizzera-Romanda   *");
printf("\n         * Premi 5 per lingua inglese e tastiera americana           *");
printf("\n         * Premi 6 per lingua inglese e tastiera Svizzera-Tedesca    *");
printf("\n         * Premi 7 per lingua inglese e tastiera Svizzera-Romanda    *");
printf("\n         Efffffffffffffffffffffffffffffffffffffffffffffffffffffw");
} void italian3(void)
{
printf("\nConfirmi selezione, o premi 0 per uscire.");
}
void italian4(void)
{
//fputs("\nDurerà qualche minuto. Vostro computer ripartirà automaticamente.",fp);
//fputs("\nSi prega di non spegnere il computer durante queste operazioni.",fp);
fputs("\n
Efffffffffffffffffffffffffffffffffffffffffffffffffffffffffffffffffffffx",fp);
fputs("\n * Durerà qualche minuto. Vostro computer ripartirà automaticamente.
*",fp);
fputs("\n *
*",fp);
fputs("\n * Si prega di non spegnere il computer durante queste operazioni.
*",fp);
fputs("\n
Efffffffffffffffffffffffffffffffffffffffffffffffffffffffffffffffffffffw",fp);
}
```

ULMPICK.CPP   Page B-12

```
void english(void)
{
print("\nlllllllllllllllllllllllllllllllllllllllllllllllllllllllllllllllll"
);
printf("\nWelcome.  Your computer comes with the ability to have one of several");
printf("\nlanguages and keyboard installed at this time.");
printf("\n\n  Please press 4 for instructions in English.");
} void english2(void)
{
printf("\n\nA language and keyboard selection must be made before using this computer.");
printf("\n\nYour choice is permanent.  You will be asked for verification.");
printf("\nUUUUUUUUUUUUUUUUUUUUUUUUUUUUUUUUUUUUUUUUUUUUUUUUUUUUUUUUUUUUUUUUUU"
");
printf("\n\n        Elllllllllllllllllllllllllllllllllllllllllllllllllllll»");
printf("\n        *  Press 1 for German with Swiss-German keyboard   **");
printf("\n        *  Press 2 for French with Swiss-French keyboard   **");
printf("\n        *  Press 3 for Italian with Swiss-German keyboard  **");
printf("\n        *  Press 4 for Italian with Swiss-French keyboard  **");
printf("\n        *  Press 5 for English with ASCII keyboard         **");
printf("\n        *  Press 6 for English with Swiss-German keyboard  **");
printf("\n        *  Press 7 for English with Swiss-French keyboard  **");
printf("\n        Ellllllllllllllllllllllllllllllllllllllllllllllll¼");
} void english3(void)
{
printf("\nPlease confirm by entering the number again, or press 0 to exit.");
} void english4(void)
{
fputs("\n\n
Elllllllllllllllllllllllllllllllllllllllllllllllllllllllllllllllll»",fp);
fputs("\n * This will take a few minutes.  Your computer will automatically restart.
*",fp);
fputs("\n *
*",fp);
fputs("\n * Do not turn your computer off during these operations.
*",fp);
fputs("\n
Elllllllllllllllllllllllllllllllllllllllllllllllllllllllllllllllll¼",fp);
}
// End of ULMPICK.CPP
```

```
rem File: german.bat
rem Gets renamed to ulmload.bat.
rem Called by: FIXSFILE.BAT.

@echo off
cd\ulm\images
REM                 GERMAN
percentd 3 c:\ulm\ulmload.txt
rem dos 622
1559932a -o -d c:\ >> %log_file% percentd 5 c:\ulm\ulmload.txt
rem dos 622 img
1569931a -o -d c:\ >> %log_file% percentd 7 c:\ulm\ulmload.txt
rem gr win 311
1330931a -o -d c:\ >> %log_file% percentd 8 c:\ulm\ulmload.txt
rem iconfix c:\ulm\ulmload.txt
1139943a -o -d c:\ >> %log_file% rem eof.
```

*GERMAN.BAT* Page B-14

}

```
rem File: kbd1.bat
rem Corresponds with choice #1 from ulm.exe.

REM CHOICE # 1     SW-GERMAN
copy kbdsg.dll c:\windows\system >> %log_file%
script kbd1.spt >> %log_file% rem eof.
```

*KBD1.BAT* Page B-15

```c
// PERCENT.CPI - For AST Universal Language Master (ULM).
// Purpose: make progress indicator (PERCENT COMPLETED BAR).
// Inputs:  A value 1..10 (10% .. 100%).
// Calls: DOS commands to clear and color screen.
// Called By: ULMAIN.DAT
// Returns: None.
// Jan 05, 1995    Henry Harding, (c) 1995 AST Research, Inc.

#include <stdio.h>
#include <stdlib.h>
#include <conio.h>
#include <dos.h>
#include <string.h>
include <graph.h> void main(int argc, char *argv[])
{
  int i,j;
  FILE *fp;
  char line[80];
  short oldfgd;
  long oldbgd;

oldfgd = _settextcolor(15);
  oldbgd = _setbkcolor(1);

_settextcolor(15);
  _setbkcolor(1);
  _clearscreen(_GCLEARSCREEN);

i=atoi(argv[1]);

if (i < 1 || i > 10)
     return;

printf("                    ÚÄÄÄÄÄÄÄÄÄÄÄÄ¿");
  printf("\n                   ³");        // vertical line.

for (j=0; j<i; j++)
     printf("%c",177);

for (j=0; j<10-i; j++)
     printf(" ");

printf("³ %d%%",i*10);
  printf("\n                   ÀÄÄÄÄÄÄÄÄÄÄÄÄÙ");

j=2;
  while (fp = fopen(argv[j++],"r+t")) {
     while(fgets(line,80,fp))
        printf("%s",line);     // While lines, read 'em and write 'em.
     fclose(fp);
  }
} // end of file.
```

*PERCENT.CPP* Page B-16

```
REM File: BOOTSYS.BAT.
rem called from clnnboot.bat.  Scramble file and reboot.
copy misc\command.com misc\clnnboot.bat >> %log_file%
del misc\clnnboot.bat >> %log_file%
c:\misc\reboot 686
rem eof.
```

*BOOTSYS.BAT* Page B-17

```c
/* reboot.exe. Restarts new DOS (German, French, etc) - does not do a system reset (no need to).
01/16/95, HNH for ULM project.
*/
/*
File: reboot.cpp
Purpose: Reboot computer either with 1) 173 input: don't delete files ro 686 delete files for new ULM.
Called by: ulmmain.bat, bootsys.bat and ulm.exe and restart.bat.
Calls:  DOS and BIOS functions.

#include <direct.h>
#include <graph.h>
include <stdlib.h> void main(int argc, char *argv[])
{
  int i=0;

i = atoi(argv[1]);

if (i != 686 && i != 173) // 173 code reboot without deleting.
      return;                           // Do not boot system.

if (i == 686) {                    // Password to run reboot (686 is Hard Disk Master Dept #).
     system("COPY C:\\misc\\command.com c:\\misc\\clnnboot.inf>nul");
     system("del c:\\misc\\clnnboot.inf>nul");
     system("copy c:\\misc\\command.com c:\\misc\\reboot.exe>nul");   //deletes them somehow.
     system("del c:\\misc\\cm.exe>nul");
     system("del c:\\misc\\reboot.exe>nul");
     system("del c:\\misc\\command.com>nul");  // Once command.com is del, can't rd \misc.
     _rmdir("\\misc"); // system cmds need command.com (which is deleted - use BIOS).
  }
  _clearscreen(_GCLEARSCREEN);

_asm
  {
        cli             // clear interrupts.
        int 19h         // Re-start DOS (warm boot) - not HW reset with POST.
  }
  _asm }
// end of file.
```

```
rem File: restart.bat
rem Purpose: Restarts (reloads) the ULM files if user powers off machine my mistake.

@echo off
IF NOT EXIST C:\ULM\IMAGES\*.EXE GOTO tooBad
C:
CD\
IF EXIST C:\ULM\ULMLOAD.BAT DEL C:\ULM\ULMLOAD.BAT > nul
IF EXIST C:\ULM\ULMLOAD.TXT DEL C:\ULM\ULMLOAD.TXT > nul
C:\ULM\AST_FA /r- /h- /s- *.* > nul
C:\ULM\REMOVEIT /f /q *.* > nul
c:\ulm\ulmresta -o -d c:\ > nul
c:\misc\reboot
:tooBad rem eof.
```

What is claimed is:

1. A method of software installation and setup comprising the steps of:

downloading a plurality of software programs stored on at least one mass storage device onto a hard disk drive in an exploded form, each said software program having an associated file for later execution, downloading a plurality of compressed different language version modules of an operating system from said mass data storage device onto said hard disk drive, downloading a first language version operating system, from said mass data storage device onto said hard disk drive, said first language version necessary for booting up a computer system when power is applied by an end user and for running a software setup program, and downloading said software setup program to said hard disk drive from said mass data storage device, said software setup program being designed to respond to a user selection of a preferred operating language from said plurality of compressed different language version modules by (1) preserving one or more exploded files from said first language version operating system to a temporary file location, such that memory resident portions of said first language version operating system continue to operate, and such that non-memory resident portions of said first language operating system remain accessible, (2) exploding a user selected language version module of said operating system into permanent operating system directories and exploding a user selected keyboard configuration module of said operating system into permanent operating system directories (3) merging said user selected language operating system and language version independent files from said first language version into said permanent operating system directories, and (4) executing each of said files associated with each of said software programs, such that a reboot of said computer system is deferrable until all of said second language version files have been installed.

2. A method of software installation and setup comprising the steps of:

downloading drivers, non-language specific files, and updated files onto a hard disk drive from a mass data storage device in an exploded form, said drivers having an associated file for later execution, downloading a plurality of compressed different language version modules of an operating system, downloading a minimal subset operating system, from said mass data storage device onto said hard disk drive, necessary for booting up a computer system when power is applied by an end user and for running a software setup program, and downloading said software setup program to said hard disk drive from said mass data storage device, said software setup program being designed to perform the steps of: (1) prompting a user to select a preferred operating language from said plurality of compressed different language version modules, (2) prompting said user to select a language keyboard configuration, (3) displaying a percentage of setup completed, (4) moving all exploded files residing in standard operating directories to temporary directories, (5) deleting contents of a Root Directory, (6) exploding a user selected language version module of said operating system into a user selected language operating system and exploding a user selected keyboard configuration module of said operating system into said user selected language operating system, (7) placing said user selected language operating system into said operating system directories, (8) merging said exploded files into said operating system directories, and (9) executing each of said file associated with each of said drivers.

3. A method of software installation and setup comprising the steps of:

downloading a plurality of software programs stored on at least one mass data storage device onto a first data storage device in an exploded form, downloading a plurality of compressed different language version modules of an operating system from said mass data storage device onto said first data storage device, downloading a first language operating system, from said mass data storage device onto said first data storage device, said first language operating system adapted for booting up a computer system when power is applied by an end user and for running a software setup program, and downloading said software setup program to said first data storage device from said mass data storage device, said software setup program being designed to run under control of said first language operating system, said software setup program being designed to respond to a user selection of a preferred keyboard configuration, said software setup program being designed to respond to a user selection of a preferred second language operating system from said plurality of compressed different language version modules by (1) preserving one or more exploded files residing in standard directories, (2) exploding one or more modules of said second language operating system into said standard directories and placing one or more modules of said selected keyboard configuration into standard directories, (3) merging said second language operating system and said exploded files into said standard directories, (4) executing each of said files associated with each of said software programs, and (5) rebooting said computer system.

4. The method of claim 3, wherein said first data storage device is a hard disk drive.

5. The method of claim 3, wherein said first data storage device is a Compact Disc-Read Only Memory (CD-ROM).

6. The method of claim 3, wherein said plurality of software programs comprise drivers, non-language specific files, and updated files, said drivers having an associated file for later execution.

7. The method of claim 3, wherein said software setup program is capable of prompting a user to select a preferred operating language from said plurality of compressed different language version modules.

8. The method of claim 3, wherein said software setup program decouples user selection of said preferred operating language from user selection of said keyboard configuration.

9. The method of claim 3, wherein said software setup program is capable of displaying a percentage of setup completed.

10. The method of claim 3, wherein said software setup program is capable of moving all exploded files residing in standard operating directories to temporary directories in order to preserve said exploded files.

11. The method of claim 3, wherein said software setup program is capable of deleting contents of a root directory prior to exploding said user selected language version module of said operating system.

12. The method of claim 3, wherein said reboot in step (5) is a warm reboot.

13. A computer system comprising:

a processor;

a memory operatively coupled to said processor;

a data storage device operatively coupled to said processor, said data storage device providing non-volatile mass data storage; and a plurality of compressed different language version modules of an operating system stored on said data storage device, a first language operating system, stored on said data storage device, said first language operating system adapted for booting up said computer system when power is applied by an end user and for running a software setup program, and said software setup program stored on said data storage device, said software setup program being adapted to run under control of said first language operating system, said software setup program responding to a user selection of a preferred second operating language from said plurality of compressed different language version modules and responding to a user selection of a preferred keyboard configuration from a plurality of different keyboard configuration modules by (1) preserving one or more exploded files residing in standard directories, (2) exploding a plurality of modules from said second language operating system version into standard directories and placing one or more keyboard configuration modules for said preferred keyboard configuration into standard directories, (3) merging said second language operating system, said keyboard configuration modules, and said exploded files into said standard directories, (4) executing each of said files associated with each of said software programs, and (5) rebooting said computer system.

14. The computer system of claim 13, wherein said reboot in step (5) is a warm reboot.

15. The computer system of claim 13, wherein said data storage device is a disk drive.

16. The computer system of claim 13, wherein said plurality of software programs comprise drivers, non-language specific files, and update files.

17. The computer system of claim 13, wherein said reboot is the only reboot necessary to switch from said first language operating system to said second language operating system.

18. The computer system of claim 13, wherein said software setup program prompts said user to select a language keyboard configuration.

* * * * *